(12) United States Patent
Kendall

(10) Patent No.: US 10,460,135 B1
(45) Date of Patent: Oct. 29, 2019

(54) FOLDABLE ORGANIC LIGHT EMITTING DIODE ("OLED") PURCHASING INSTRUMENT READER

(71) Applicant: Bank of America Corporation, Charlotte, NC (US)

(72) Inventor: Russell Kendall, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/040,864

(22) Filed: Jul. 20, 2018

Related U.S. Application Data

(63) Continuation-in-part of application No. 15/957,040, filed on Apr. 19, 2018, now Pat. No. 10,331,990, (Continued)

(51) Int. Cl.
*G06K 7/00* (2006.01)
*G06Q 20/34* (2012.01)
(Continued)

(52) U.S. Cl.
CPC ....... *G06K 7/006* (2013.01); *G06K 19/07703* (2013.01); *G06Q 20/341* (2013.01); (Continued)

(58) Field of Classification Search
CPC .............. G06K 7/006; G06K 19/07703; G07F 7/0886; H01L 27/32; H01L 51/5012; G06Q 20/341
See application file for complete search history.

(56) References Cited

U.S. PATENT DOCUMENTS

| 2,912,066 A | 11/1959 | Ellithorpe |
| 3,703,864 A | 11/1972 | Bradford |
(Continued)

FOREIGN PATENT DOCUMENTS

| DE | 102009028991 | 8/2009 |
| EP | 0827066 | 7/1997 |
| WO | WO 2013131153 | 4/2012 |

OTHER PUBLICATIONS

Conor Gaffey, "World's Smallest Nano Chip will Double Processing Power of Smartphones," Jun. 9, 2015.
(Continued)

*Primary Examiner* — Seung H Lee
(74) *Attorney, Agent, or Firm* — Weiss & Arons LLP; Michael A. Springs, Esq.

(57) ABSTRACT

A foldable circuit board that includes OLED display technology is provided. Apparatus may include embedded card reading technology (e.g., EMV, magnetic stripe, QR-Reader Technology) into a foldable OLEO-based mobile device. The mobile device may fold, to create a channel for swiping a purchasing instrument. Such a device may provide portable card reading technology and an ability to seamlessly transmit the captured information to a remote server/network for authorization. Such devices may avoid use of an external plug-in device to capture payment instrument information. Also, such devices may revive use of magnetically encoded information which is typically less-expensive-to-manufacture and provides a faster "swipe" time to read the magnetically encoded information as compared to other technology such as EMV chips.

20 Claims, 16 Drawing Sheets

Related U.S. Application Data which is a continuation of application No. 15/497,030, filed on Apr. 25, 2017, now Pat. No. 9,978,010, which is a continuation of application No. 15/187,931, filed on Jun. 21, 2016, now Pat. No. 9,665,818.

(51) Int. Cl.
  *H01L 51/50* (2006.01)
  *G06K 19/077* (2006.01)
  *H01L 27/32* (2006.01)
  *G07F 7/08* (2006.01)

(52) U.S. Cl.
  CPC ............ *G07F 7/0886* (2013.01); *H01L 27/32* (2013.01); *H01L 51/5012* (2013.01)

(56) References Cited

U.S. PATENT DOCUMENTS

| | | | |
|---|---|---|---|
| 3,946,206 A | 3/1976 | Darjany | |
| 4,372,225 A | 2/1983 | Tissot et al. | |
| 4,557,352 A | 12/1985 | Tschappat, Jr. | |
| 4,953,326 A | 9/1990 | Wexler et al. | |
| 4,968,873 A | 11/1990 | Dethloff et al. | |
| 5,168,354 A | 12/1992 | Martinez et al. | |
| 5,313,051 A | 5/1994 | Brigida et al. | |
| 5,539,819 A | 7/1996 | Sonoyama et al. | |
| 5,693,956 A | 12/1997 | Shi et al. | |
| 5,734,154 A | 3/1998 | Jachimowicz et al. | |
| 5,770,849 A | 6/1998 | Novis et al. | |
| 5,970,888 A | 10/1999 | Sheppard | |
| 6,015,092 A | 1/2000 | Postlewaite et al. | |
| 6,057,646 A | 5/2000 | Pieroth et al. | |
| 6,173,899 B1 | 1/2001 | Rozin | |
| 6,394,343 B1 | 5/2002 | Berg et al. | |
| 6,724,103 B2 | 4/2004 | Parrault | |
| 7,025,277 B2 | 4/2006 | Forrest et al. | |
| 7,270,276 B2 | 9/2007 | Vayssiere | |
| 7,357,315 B2 | 4/2008 | Vergara et al. | |
| 7,360,682 B2 | 4/2008 | Shane et al. | |
| 7,360,691 B2 | 4/2008 | Takayama | |
| 7,461,774 B2 | 12/2008 | Vergara et al. | |
| 7,523,856 B2 | 4/2009 | Block et al. | |
| 7,588,183 B2 | 9/2009 | Shane et al. | |
| 7,791,559 B2 | 9/2010 | Piasecki | |
| 7,814,016 B2 | 10/2010 | Pranger | |
| 7,856,116 B2 | 12/2010 | Rodriguez et al. | |
| 7,940,159 B2 | 5/2011 | Clemens et al. | |
| 7,992,789 B2 | 8/2011 | Borracci | |
| 8,237,068 B2 | 8/2012 | Szaikowski | |
| 8,276,823 B2 | 10/2012 | Chen | |
| 8,282,007 B1 | 10/2012 | Cloutier et al. | |
| 8,317,094 B2 | 11/2012 | Lehman | |
| 8,378,932 B2 | 2/2013 | Fein et al. | |
| 8,392,965 B2 | 3/2013 | Carter et al. | |
| 8,413,893 B2 | 4/2013 | Kim | |
| 8,471,782 B2 | 6/2013 | Muklashy et al. | |
| 8,479,981 B2 | 7/2013 | Carmichael et al. | |
| 8,399,889 B2 | 9/2013 | Wu et al. | |
| 8,523,059 B1 | 9/2013 | Mullen et al. | |
| 8,540,151 B1 | 9/2013 | Snyder et al. | |
| 8,678,293 B2 | 3/2014 | Chen | |
| 8,756,680 B2 | 6/2014 | Shashidhar | |
| 8,810,816 B2 | 8/2014 | Fischer et al. | |
| 8,820,638 B1 | 9/2014 | Cotter et al. | |
| 9,250,657 B2 | 2/2016 | Kim et al. | |
| 9,470,404 B2 | 10/2016 | Lee et al. | |
| 9,491,879 B2 | 11/2016 | Cheng et al. | |
| 9,538,127 B2 | 1/2017 | Gish | |
| 9,577,216 B2 | 2/2017 | Fujino et al. | |
| 9,665,818 B1 * | 5/2017 | Cardinal | G06K 19/0704 |
| 10,056,048 B2 | 8/2018 | Kim | |
| 2001/0007332 A1 | 7/2001 | Kjonaas et al. | |
| 2003/0145205 A1 | 7/2003 | Sarcanin | |
| 2003/0208405 A1 | 11/2003 | Putman et al. | |
| 2005/0064936 A1 | 3/2005 | Pryor | |
| 2005/0102499 A1 | 5/2005 | Kosuga et al. | |
| 2005/0134461 A1 | 6/2005 | Gelbman et al. | |
| 2005/0173518 A1 | 8/2005 | Takayama | |
| 2005/0263590 A1 | 12/2005 | Branck et al. | |
| 2006/0016884 A1 | 1/2006 | Block et al. | |
| 2006/0091223 A1 | 5/2006 | Zellner et al. | |
| 2006/0131393 A1 | 6/2006 | Cok et al. | |
| 2006/0261174 A1 | 11/2006 | Zellner et al. | |
| 2006/0289629 A1 | 12/2006 | Smith et al. | |
| 2007/0115202 A1 | 5/2007 | Kiesenhofer | |
| 2007/0273507 A1 | 11/2007 | Burchell et al. | |
| 2007/0279315 A1 | 12/2007 | Laves et al. | |
| 2008/0035736 A1 | 2/2008 | Tompkin et al. | |
| 2008/0105751 A1 | 5/2008 | Landau | |
| 2008/0158150 A1 | 7/2008 | Rossman et al. | |
| 2009/0039154 A1 | 2/2009 | Williams et al. | |
| 2009/0278452 A1 | 11/2009 | Kim | |
| 2009/0314840 A1 | 12/2009 | Granucci et al. | |
| 2010/0084476 A1 | 4/2010 | Zellner et al. | |
| 2010/0260388 A1 | 10/2010 | Garrett et al. | |
| 2010/0302206 A1 | 12/2010 | Yu et al. | |
| 2011/0058113 A1 | 3/2011 | Threlkel et al. | |
| 2011/0060640 A1 | 3/2011 | Thompson et al. | |
| 2011/0140841 A1 | 6/2011 | Bona et al. | |
| 2011/0148944 A1 | 6/2011 | Kobayashi | |
| 2011/0164047 A1 | 7/2011 | Pance | |
| 2011/0178928 A1 | 7/2011 | Carmichael et al. | |
| 2011/0241996 A1 | 10/2011 | Vesely | |
| 2012/0019434 A1 | 1/2012 | Kuhlman et al. | |
| 2012/0274727 A1 | 11/2012 | Robinson et al. | |
| 2012/0280924 A1 | 11/2012 | Kummer et al. | |
| 2013/0162594 A1 | 6/2013 | Paulsen et al. | |
| 2013/0221112 A1 | 8/2013 | Lai et al. | |
| 2013/0232082 A1 | 9/2013 | Krawczewicz et al. | |
| 2013/0341394 A1 | 12/2013 | Seo et al. | |
| 2014/0007002 A1 | 1/2014 | Chang et al. | |
| 2014/0081729 A1 | 3/2014 | Ocher | |
| 2014/0093144 A1 | 4/2014 | Feekes | |
| 2014/0114861 A1 | 4/2014 | Mages et al. | |
| 2014/0118415 A1 | 5/2014 | Seo | |
| 2014/0172700 A1 | 6/2014 | Teuwen et al. | |
| 2014/0226275 A1 | 8/2014 | Ko et al. | |
| 2014/0267960 A1 | 9/2014 | Ward | |
| 2014/0291406 A1 | 10/2014 | Ko | |
| 2014/0337957 A1 | 11/2014 | Feekes | |
| 2014/0339315 A1 | 11/2014 | Ko | |
| 2014/0353384 A1 | 12/2014 | Hoegerl et al. | |
| 2014/0374494 A1 | 12/2014 | Seo | |
| 2015/0069126 A1 | 3/2015 | Leon | |
| 2015/0077646 A1 | 3/2015 | Chen et al. | |
| 2015/0179025 A1 | 6/2015 | Cowell | |
| 2015/0262052 A1 | 9/2015 | Pahuja | |
| 2016/0004945 A1 | 1/2016 | Wade | |
| 2016/0027391 A1 | 1/2016 | Gibson et al. | |
| 2016/0054479 A1 | 2/2016 | Ho et al. | |
| 2016/0085325 A1 | 3/2016 | Lee et al. | |
| 2016/0098700 A1 | 4/2016 | Johnson et al. | |
| 2016/0098709 A1 | 4/2016 | Johnson et al. | |
| 2016/0171461 A1 | 6/2016 | Hoover et al. | |
| 2016/0210453 A1 | 7/2016 | Seo et al. | |
| 2016/0224528 A1 | 8/2016 | Trevarthen et al. | |
| 2016/0254336 A1 | 9/2016 | Zhang et al. | |
| 2016/0307089 A1 | 10/2016 | Wurmfeld et al. | |
| 2017/0103718 A1 | 4/2017 | Miller | |
| 2017/0357979 A1 | 12/2017 | Khurana et al. | |

OTHER PUBLICATIONS http://www.us.schott.com/innovation/ultrathinglass/, Retrieved on Sep. 14, 2016.

"Schott's Reliable and Strong Ultra-Thin Glass Features in Fingerprint Sensors in new Smartphones," Retrieved on Sep. 14, 2016.

Ron Martens, "The OLED Handbook, A Guide to OLED Technology, Industry & Market," 2015 Edition.

Bryce Kellogg, Vamsi Talla, Shyamnath Gollakota and Joshua R. Smith, "Passive Wi-Fi: Bringing Low Power to Wi-Fi Transmissions," Retrieved on May 11, 2016.

(56) References Cited

OTHER PUBLICATIONS

Ron Mertens, SecureCard—A New Secure Credit Card Technology, Utilizing an OLED Display, Nov. 21, 2006, Metalgrass Software.
John Wehr, "Card Size Specifications: When Does Card Size Matter?" Jan. 1, 2002.
Zachary Shahan, "Ultra-Thin-Solar-Cell Company Unstealths, Aims to Cut Cost of Solar Cells in Half!" Mar. 14, 2012, Sustainable Enterprises Media, Inc.
"ISO Magnetic Stripe Card Standards," Retrieved on Jul. 18, 2016.
"Coin Vs. Plastic: Which Credit Card Consolidation Tool is the Best?" Retrieved on Apr. 7, 2016, PayProTec.
"Tiny Batteries Could Revolutionize Green Energy," Retrieved on Apr. 5, 2016, National Geographic Society.
"Yubikey 4 & Yubikey 4 Nano," Retrieved on Apr. 7, 2016, Yubico.
"Magnetic Stripe Card Standards," Retrieved on Apr. 20, 2016, MagTek Inc., Seal Beach, California.
"A Power-Harvesting Pad-Less mm-sized 24/60GHz Passive Radio With On-Chip Antennas," Retrieved on Apr. 19, 2016, IEEE.
"Magnetic Stripe Card Recommendations," Retrieved on Apr. 20, 2016.
"Plastic Card Manufacturing Including Magnetic Stripe Tapelaying," Retrieved on Apr. 20, 2016.
Paul Buckley, "Flexible OLED Displays Target Volume Production in 2015," Feb. 5, 2015.
"MAX2837—2.3GHz to 2.7GHz Wireless Broadband RF Transceiver," Retrieved on May 30, 2016, Maxim Integrated.
"Ultrathin Rechargeable Lithium Polymer Batteries from PowerStream," Apr. 5, 2016, Lund Instrument Engineering, Inc.
Tom Abate, "Stanford Engineers Aim to Connect the World with Ant-Sized Radios," Sep. 9, 2014, Stanford University, Stanford California.
http://www.schott.com/advanced_optics/english/syn/advanced_optics/products/wafers-and-thin-glass/glass-wafer-and-substrates/ultra-thin-glass/index.html, Retrieved on May 30, 2016.
Jennifer Langston, "UW Engineers Achieve Wi-Fi at 10,000 Times Lower Power," Feb. 23, 2016.
Ron Mertens, "New All-In-One Credit Card Concept," Oct. 29, 2009, Metalgrass Software.
"Wi-Fi," Apr. 12, 2016, Wikimedia Foundation, Inc.
"Ant-Sized IoT Radio," Retrieved on Jul. 18, 2016.
Nick Pino, "Samsung's Latest OLED Can be a Mirror, a Window, or a TV," Jun. 11, 2015, Future US, Inc., San Francisco, California.
"Pneumatic Tube," Mar. 11, 2016, Wikimedia Foundation, Inc.
"New Virtual Tellers," Retrieved on Jun. 6, 2016, Frontier Bank.
Dario Borghino, "High-Tech Light Shutter Could Help Turn Your Windows into LCD Displays," May 1, 2015, Gizmag.
L. Zhao et al. "Novel Method for Fabricating Flexible Active Matrix Organic Light Emitting Diode (AMOLED) Displays," Sep. 21, 2011, Hewlett-Packard Development Company, L.P.
Amar Toor, "LG Unveils Flexible Plastic E-paper Display, Aims for European Launch Next Month," Mar. 29, 2012.
Martyn Williams, "Samsung, LG Show Flexible OLED, E-Paper Screens," Nov. 10, 2010.
"Electronic Paper," Jun. 10, 2016, Wikimedia Foundation, Inc.
"E Ink," Jun. 8, 2016, Wikimedia Foundation, Inc.
"Ink Technology: Electrophoretic Ink, Explained," Retrieved on Jun. 20, 2016, E Ink Holdings, Inc.
"Are Toeprints Unique, Like Fingerprints?" Retrieved on Jun. 23, 2016.
Sampath Srinivas, Dirk Balfanz, Eric Tiffany, Alexi Czeskis, "Univeral $2^{nd}$ Factor (U2F) Overview", May 14, 2016, FIDO Alliance.
"Sonavation Announces Fingerprint Imaging Through Smart Phone OLED Display," Feb. 22, 2016.
Dario Borghino, "Wearable Thermoelectric Generator Could Extend Your Smartwatch's Battery Life", Apr. 14, 2014, Gizmag.
"Inductive Charging", May 6, 2016, Wikimedia Foundation, Inc.
"Near Field Communication", Apr. 29, 2016, Wikimedia Foundation, Inc.
Sumi Das, "A Keyboard that Rises Up From Flat Touch Screens," Feb. 13, 2013.
Jessica Leber, "A Shape-Shifting Smartphone Touch Screen," Dec. 3, 2012.
Matthew Frankel, "Could This Be the Bank of the Future?" Nov. 9, 2014.
"Contactless Payment," Jul. 27, 2016, Wikimedia Foundation, Inc.
Zhiquin Chen, "Java Card Technology for Smart Cards: Architecture and Programmer's Guide," pp. 11-14, Copyright 2000, Sun Microsystems, Inc., Palo Alto, California.
"Manual Swipe Magnetic Card Reader—Peripheral Type, Compact, Manually Operated Card Reader 3S4YR-HNF," Omron Electronics, Inc., Retrieved on Jul. 5, 2018.
"Design Guide 4—Magnetic Stripe Card ISO Standards," Brush Industries, Retrieved on Jul. 6, 2018.
"Design Guide 1—Magnetic Head Core Material Selection," Brush Industries, Retrieved on Jul. 6, 2018.
"Design Guide 2—Effects of Stripe Width & Optimum Magnetic Head Performance," Brush Industries, Retrieved on Jul. 6, 2018.
"Long Life Magnetic Heads—For Read-Write or Read-Only Applications," Brush Industries, Retrieved on Jul. 6, 2018.
Dan Sweet, "PSoC as a Magnetic Card Reader," Cypress Perform, Jun. 2010.
Index of Magnetic Strip, Smart Card Readers, Digi-Key Electronics, Jul. 5, 2018.
"Shuttle," www.idtechproducts.com, Retrieved on Jul. 5, 2018.
"iMag Pro II," www.idtechproducts.com, Retrieved on Jul. 5, 2018.
"VP8800," www.idtechproducts.com, Retrieved on Jul. 5, 2018.
"Identification Cards—Integrated Circuit Cards Part 4: Organization, Security and commands for Interchange," International Standard, Second Edition, Jan. 15, 2005.
"How Does a Magnetic Stripe on the Back of a Credit Card Work?" HowStuffWorks, a division of InfoSpace Holdings LLC, Retrieved on Jul. 5, 2018.
"MagneSafe™ IntelliHead, Secure Magnetic Read Head—Encrypts Data Before it Leaves the Head," Retrieved on Jul. 6, 2018.
MagneSafe™ IntelliHead Products, Retrieved on Jul. 6, 2018.
"Magnetic Card Reader Design Kit Technical Specification," Magtek®, May 2017.
"Magnetic Stripe Card," Wikimedia Foundation, Inc., Jun. 20, 2018.
"Programmable System on a Chip," Retrieved on Jul. 5, 2018.
"MultiCLASS® Magnetic Stripe Readers—13.56 MHZ Contactless and 125 KHZ Proximity Card Readers," hidglobal.com, Retrieved on Jul. 5, 2018.
"MagTek iDynamo 5 Credit Card Swiper," Newegg, Retrieved on Jul. 5, 2018.
"PCI Compliance: What You Need to Know," Square, Inc., Retrieved on Jul. 5, 2018.
Daniel Ramsbrock et al., "Magnetic Swipe Card System Security," Retrieved on Jul. 5, 2018.
"How Do Credit Card Readers Work," Square, Inc., Retrieved on Jul. 5, 2018.
"Mobile Readers for Retail Secure Card Reader Authenticators," MagTek® Inc., Retrieved on Jul. 5, 2018.
"UDynamo For Retail Secure Card Reader Authenticator," MagTek® Inc., Retrieved on Jul. 5, 2018.
"Manual Swipe Magnetic Card Reader V3A," Omron Electronics, Inc., Retrieved on Jul. 5, 2018.
"Hardware Specifications of V4KU-*** Series Hybrid Manual Insertion Card Reader," Omron Electronics, Inc., Oct. 16, 2003.
"Specifications Manual Slide Type Magnetic Card Reader," Panasonic Communications Co., Ltd., Retrieved on Jul. 5, 2018.

* cited by examiner

FOLDABLE ORGANIC LIGHT EMITTING DIODE ("OLED") PURCHASING INSTRUMENT READER

CROSS-REFERENCE TO RELATED APPLICATIONS

This application is a continuation-in-part of U.S. patent application Ser. No. 15/957,040, filed on Apr. 19, 2018, entitled "ORGANIC LIGHT EMITTING DIODE ("OLED") UNIVERSAL PLASTIC", which is a continuation of U.S. patent application Ser. No. 15/497,030, filed on Apr. 25, 2017, entitled "ORGANIC LIGHT EMITTING DIODE ("OLED") UNIVERSAL PLASTIC", now U.S. Pat. No. 9,978,010, which is a continuation of U.S. patent application Ser. No. 15/187,931, filed on Jun. 21, 2016, entitled "ORGANIC LIGHT EMITTING DIODE ("OLED") UNIVERSAL PLASTIC", now U.S. Pat. No. 9,665,818, all of which are hereby incorporated by reference herein in their respective entireties.

FIELD OF TECHNOLOGY

Aspects of the disclosure relate to a foldable circuit board that is configured to form a channel for reading information encoded on a magnetic stripe or other storage media.

BACKGROUND

There is a need for a portable device that may read information encoded on a purchasing instrument. For example, a travelling salesperson may wish to complete a sale at a customer location. Completing the sale at the customer location may allow a product to be transferred to the customer at the location of the customer. Completing the sale at the customer location may allow the salesperson to receive payment for the product at the location of the customer.

To complete a sale using a credit card, or other purchasing instrument, payment information encoded on the purchasing instrument is typically extracted from the purchasing instrument. For example, credit cards may include information encoded on a magnetic stripe. The information encoded on the magnetic stripe may be read when the card is "swiped" through a card reader.

After extracting the payment information, the payment information and specific transaction information is typically communicated to a transaction processing network for authorization. The specific transaction information may include a location of the sale, amount of the sale and items being purchased. The transaction processing network may electronically link acquiring banks and issuing banks.

The payment and transaction information may be submitted to the acquiring banks and issuing banks for authorization. A communication link provided by a salesperson's mobile device may be utilized to submit the payment and transaction information. For example, the mobile device may provide access to a cellular network or provide a WiFi link to a communication network.

An authorization process may include review of the purchasing instrument and transaction information. For example, the acquiring banks and/or issuing banks may review the payment and transaction information and determine whether to approve the sale. The acquiring banks and issuing banks may route their authorization decision back through the transaction processing network to the salesperson's mobile device.

Thus, there is a need to provide a mobile device that is capable of securely reading purchasing instrument information and securely transmitting the information for authorization from any customer location. Currently, add-on devices are provided that plug into a salespersons mobile device. The add-on device may plug into an available port on a mobile device.

The add-on device may include a card reader. The card reader may read data encoded on a magnetic stripe as a purchasing instrument is passed through the card reader. For example, Square, Inc. of San Francisco, Calif. provides a card reader that plugs into a headphone jack of a mobile phone. MagTek Inc., of Seal Beach, Calif. also provides a card reader under the uDynamo mark that is compatible with over 221 mobile devices. The uDynamo device is an add-on device that also plugs into a headphone jack of a mobile device.

There are disadvantages to add-on devices that plug into an available port. For example, the add-on device is typically not well integrated into a form factor associated with the mobile device. The add-on device, when plugged into the mobile device, protrudes from the mobile device and increases a size/bulk of the mobile device. Typically, a salesperson plugs in the add-on device immediately prior to accepting the purchasing instrument from the customer. Typically, the salesperson unplugs the add-on device immediately after the customer's purchasing instrument has been passed through the card reader.

Leaving the add-on device plugged into the mobile device increases likelihood that that add-on device will be damaged. For example, the connection point linking the add-on device to the port of the mobile device is not typically strong and is susceptible to breakage.

Thus, a salesperson will typically disconnect the add-on device from the mobile device after consummating a sale. Frequent plug-in and unplug activity also increases a risk of damage to the add-on device and/or the mobile device.

Furthermore, when the add-on device is plugged in to a port of the mobile device, the port cannot be used by other accessories.

It would be desirable to provide a mobile payment solution that is integrated into the mobile device. It would be desirable to provide a mobile payment solution that does not require an external add-on device to be plugged into, or unplugged from, a mobile device. It would be desirable to leverage OLED technology to provide a mobile device with an ability to capture and transmit purchasing instrument and transaction information without disadvantages of an add-on device.

Accordingly, it would be desirable to provide apparatus and methods for a foldable OLED purchasing instrument reader.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
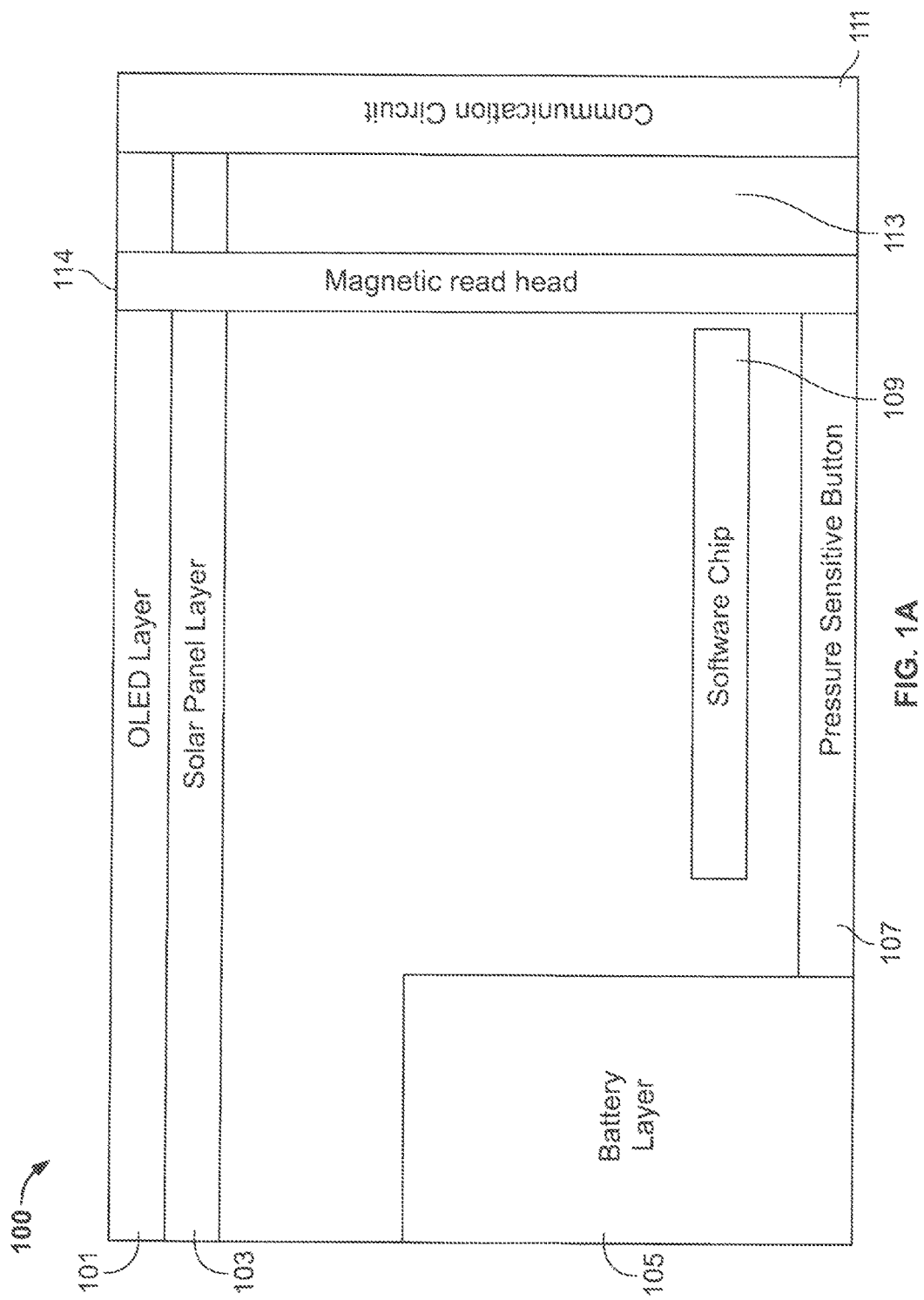
FIG. 1A shows illustrative apparatus in accordance with principles of the disclosure.

Aspects of the disclosure relate to a circuit board that utilizes OLED technology to provide a mobile device that is capable of reading data encoded on a purchasing instrument.

A purchasing instrument may include a credit card, debit card and/or other forms of payment. Such other forms of payment may include an instrument or device that includes a contactless chip, such as an ISO14443-compliant contactless chip, a smart phone, a tablet, a transponder or any other suitable electronic purchasing devices. Purchasing instruments may store sensitive data in a magnetic stripe, a bar code, a silicon chip, nonvolatile computer readable media or any other suitable data storage device or format.

Suitable purchasing instruments may also conform to specifications published by the International Organization for Standardization. Illustrative specifications may include: ISO/IEC 7810, ISO/IEC 7811 and ISO/IEC 7816, which are hereby incorporated herein by reference in their respective entireties.

OLED display technology may enhance usability of mobile devices. OLEDs include solid-state semiconductors constructed from a thin film of organic material. OLEDs emit light when electricity is applied across the thin film of organic material. Because OLEDs are constructed using organic materials, OLEDs may be safely disposed without excessive harm to the environment.

OLEDs may also be used to construct a display that is flexible. OLED displays may be folded, bent or rolled. An exemplary circuit board as described herein may include an OLED display that may be folded, bent or rolled to form a channel for receiving a purchasing instrument. The purchasing instrument may be inserted into the channel. Inserting the purchasing instrument into the channel may position the purchasing instrument relative to a reader embedded in the circuit board. The reader may extract information encoded on the purchasing instrument.

For example, the purchasing instrument may be swiped through the channel. The purchasing instrument may be dipped into the channel. As the purchasing instrument moves through the channel, information encoded on the purchasing instrument may be extracted. For example, the purchasing instrument may include information encoded on a magnetic stripe. The information encoded on the magnetic stripe may be read when the purchasing instrument is "swiped" through the channel.

Such bendable OLED devices that include components for reading information encoded on magnetic stripes without add-on devices, may revive use of magnetically encoded information. Magnetically encoded information, such as information encoded on magnetic stripes, is typically less-expensive-to-manufacture than other storage media. Information stored on magnetic stripes is also typically read faster compared to other technology such as EMV chips. For example, a magnetic stripe may be swiped past a magnetic read head (and information extracted by the magnetic read head from the magnetic stripe), in less time than it takes a chip reader to read information on an EMV chip.

In some embodiments, the information may be extracted from the purchasing instrument after the purchasing instrument is in a static position within the channel. For example, a purchasing instrument may include information encoded on an "EMV" chip. EMV is a technology that derives its name from the companies (Europay, MasterCard, and Visa) that helped develop the technology. The purchasing instrument may be inserted into the channel until the purchasing instrument is positioned adjacent to a chip reader.

The foldable circuit board may include an EMV chip reader. The EMV chip reader may be accessible through an OLED display on a face of the foldable circuit board. In some embodiments, the EMV chip reader may be positioned underneath an OLED display on a face of the foldable circuit board. In such embodiments, the EMV chip reader may be accessible via induction or other contactless methods of electronically transferring data and/or power.

After the information is captured from the purchasing instrument, the OLED display may be unfolded, unbent or unrolled thereby returning the mobile device to its default form factor.

Furthermore, OLEDs may be used to construct a display that consumes less power compared to other display technologies. For example, in a Liquid Crystal Display (hereinafter, "LCD") power must be supplied to the entire backlight to illuminate just one pixel in the display. In contrast, an OLED display does not require a backlight. Furthermore, in an OLED display, preferably, only the illuminated pixel draws power.

Therefore, power efficiency of OLED technology presents a possibility for designing circuit boards that provide enhanced security and functionality for such purchasing instruments.

Apparatus and methods for a foldable circuit board are provided.

The circuit board may include a touch sensor. The touch sensor may be positioned above or below the OLED display. In some embodiments, the touch sensor may not greater than 0.001 mm thick. The foldable OLED display may be touch-sensitive.

The circuit board may include a pressure sensitive button. The pressure sensitive button may have a thickness that is not greater than 0.8 mm. The pressure sensitive button may be actuated by a user to activate the circuit board. For example, actuating the pressure sensitive button may activate the processor or communication circuits.

In some embodiments, the circuit board may be activated in response to receiving high frequency wireless signals. The high frequency signals may provide power to one or more components (e.g., the communication circuit) of the circuit board. In response to receiving the power, the processor circuit may be activated and begin to draw power from a battery or other power source on the circuit board.

The circuit board may operate in a networked environment. The circuit board may support establishing network connections to one or more remote computers. Such remote computers may be nodes on a network. The nodes may be personal computers or servers that include many or all of the elements described above relative to the circuit board. The network connections may include a local area network ("LAN") and a wide area network ("WAN"), and may also include other networks. When used in a LAN networking environment, the circuit board may be connected to the LAN through a network interface or adapter. The communication circuit may include the network interface or adapter.

When used in a WAN networking environment, the circuit board may include a modem or other means for establishing communications over a WAN, such as the Internet. The communication circuit may include the modem.

It will be appreciated that the network connections shown are illustrative and other means of establishing a communications link between devices may be used. The existence of any of various well-known protocols such as TCP/IP, Ethernet, FTP, HTTP and the like is presumed, and the circuit board can be operated in a client-server configuration to permit a user to retrieve web pages from a web-based server. Web browsers can be used to display and manipulate data on web pages.

The circuit board and network nodes may include various other components, such as a battery, a speaker, and antennas (not shown). For example, network nodes may be portable devices such as a laptop, a tablet, a smartphone or any other suitable device for receiving, storing, transmitting and/or displaying relevant information.

The circuit board may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The circuit board may utilize computer-executable instructions, such as program modules, being executed by a computer. Generally, program modules include routines, programs, objects, components, data structures, etc. that perform particular tasks or implement particular abstract data types. The circuit board may be operational with distributed computing environments where tasks are performed by remote processing devices that are linked through a communications network. In a distributed computing environment, program modules may be located in both local and remote computer storage media including memory storage devices.

The foldable circuit board may include hardware for reading information stored on a purchasing instrument. Such hardware may include a read head. The read head may extract information encoded on a magnetic stripe. The read head may extract information encoded on an EMV chip. The read head may be configured to extract information from any suitable storage media.

The foldable circuit board may be configured to fold or bend and form a channel. The channel may guide the purchasing instrument to a position relative to the read head.

The foldable circuit board may include a programmable array of OLEDs. The array of OLEDs may form a foldable OLED display. The foldable OLED display may include a magnetic read surface area. The magnetic read surface area may be no larger than 4 inches×1.25 inches. For example, a magnetic read surface area may be 3.5 inches×0.75 inches. The foldable OLED display may include a swipe channel surface area. A size of the swipe channel surface area may correspond to a size of the magnetic read surface area.

The foldable circuit board may have a fold axis. The foldable circuit board may include a magnetic read head. The magnetic read head may be embedded within the magnetic read surface area.

The magnetic read head may be accessible through an OLED display on a face of the foldable circuit board. In some embodiments, the magnetic read head may be positioned underneath an OLED display, on a face of the foldable circuit board. In such embodiments, the magnetic read head may be accessible via induction or other contactless methods of electronically transferring data and/or power.

A magnetic read head may be configured to read at least one track of data encoded on a magnetic stripe. An exemplary magnetic stripe may include three tracks of data. As per ISO/IEC 7811, each track may be 0.110-inch wide. Track one may be capable of storing 210 bits per inch (bpi) and store 79 six-bit (plus parity bit) read-only characters. Track two may be capable of storing 75 bpi, and store 40 four-bit (plus parity bit) characters. Track three may be capable of storing 210 bpi, and store 107 four-bit (plus parity bit) characters.

The magnetic read head may read data from one or more tracks. The magnetic read head may read data from one or more tracks simultaneously.

The magnetic read head may read data on magnetic stripes having differing coercivity. For example, the magnetic read head may read data encoded on magnetic stripes having a coercivity in the range of 300 to 5000 oersted.

The magnetic read head may be configured to encrypt captured data before transmitting the captured data using a communication circuit. The magnetic read head may be configured to encrypt captured data before storing the captured data to the non-transitory memory.

For example, the magnetic read head may include specialized electronics inside the read head. Captured data may be encrypted at the earliest point of entry—as soon as it is read by the magnetic read head.

The foldable circuit board may include a communication circuit. The communication circuit may provide access to a communication network.

The foldable circuit board may include a processor circuit. The processor circuit may include a non-transitory memory. The processor circuit may include a processor.

The processor circuit may alternatively be referred to herein as a software chip. The processor circuit may have a thickness that is not greater than 0.25 mm. The processor circuit may include a processor for controlling overall operation of the foldable circuit board and its associated components. The foldable circuit board may include RAM, ROM, an input/output ("I/O") module and a non-transitory or nonvolatile memory.

The I/O module may include a microphone, button and/or touch screen which may accept user provided input. The I/O module may include one or more of a speaker for providing audio output and a display for providing textual, audiovisual and/or graphical output. The display may include one or more OLEDs.

Software may be stored within the non-transitory memory and/or other storage media. The software may provide instructions to the processor for enabling the circuit board to perform various functions. For example, the non-transitory memory may store software used by the circuit board, such as an operating system, application programs, web browser and a database. Alternatively, some or all of computer executable instructions of the circuit board may be embodied in hardware or firmware components of the circuit board.

Application programs, which may be used by the circuit board, may include computer executable instructions for invoking user functionality related to communication, such as email, short message service ("SMS"), and voice input and speech recognition applications. Application programs may utilize one or more algorithms that securely store sensitive data, process received executable instructions, perform power management routines or other suitable tasks.

The foldable circuit board may include a power source. The power source may provide power for the OLED display. The power source may provide power for operating the communication circuit. The power source may provide power for operating the magnetic read head. The power source may provide power for operating the processor circuit. The power source may provide power for operating any suitable component of the foldable circuit board.

For example, the power source may power the OLED display, the communication circuit and the processor circuit. Illustrative power sources may include a battery. The battery may be rechargeable. The power source may be a renewable power source. The power source may be flexible. The power source may include one or more batteries.

The power may include electromagnetic waves. For example, the circuit board's power source may include high frequency signals received from a node on a wireless network. The circuit board may be configured to utilize received high frequency signals to recharge a battery or provide power to other components of the circuit board.

The power source of the circuit board may include a solar panel. The power source of the circuit board may include a thermoelectric generator. The thermoelectric generator may utilize body heat to generate electricity.

The power source may have any suitable thickness. For example, the power source may be not greater than 0.8 mm thick. The power source may not be greater than 0.5 mm thick.

The foldable OLED display may be configured to bend about the fold axis. The fold axis may be positioned parallel to a width of the circuit board. The fold axis may be positioned parallel to a length of the circuit board.

When the foldable circuit board and/or associated OLED display are bent about the fold axis, the magnetic read surface area may be positioned adjacent to the swipe channel surface area. Positioning the magnetic read surface area adjacent to the swipe channel surface area may form a swipe channel.

The non-transitory memory may store machine readable instructions. The machine readable instructions may be executable by the processor circuit. The processor circuit may move the executable instructions to a transitory memory during execution of the instructions. The machine readable instructions, when executed by the processor, may detect formation of the swipe channel and activate the magnetic read head. The machine readable instructions, may detect formation of the swipe channel by detecting that the magnetic read surface area is within a threshold distance of the swipe channel surface area.

An exemplary threshold distance may include 0.04 to 0.05 inches of separation between the magnetic read surface area and the swipe channel surface area. When the magnetic read surface area is within the threshold distance of the swipe channel surface area, the magnetic read head may touch or contact the swipe channel area.

After formation of the swipe channel, the magnetic read head may be positioned to extract information from a purchasing instrument inserted into the swipe channel. For example, the swipe channel may form one or more guide surfaces that position a magnetic stripe of the purchasing instrument to pass the magnetic read head. When the magnetic stripe passes the magnetic read head, the magnetic read head extracts data stored on the magnetic stripe.

The swipe channel may be sized to minimize tilt of a purchasing instrument that is moved along the channel. For example, the magnetic read head preferably follows tilts of the purchasing instrument to maintain contact with the magnetic stripe. Excessive swipe channel width may allow excessive tilt. Minimal swipe channel height may allow excessive tilt. Excessive tilt may prevent the magnetic read head from contacting the magnetic stripe and extracting information on the magnetic stripe.

The communication circuit may be configured to transmit information extracted from the purchasing instrument to a remote server. For example, the communication circuit may transmit the extracted data to a transaction processing network for authorization.

The magnetic read head and swipe channel may be configured to accept and read a variety of magnetic stripes. For example, the magnetic read head and swipe channel may be sized to accept and read credit cards, debit cards, gift cards, loyalty cards, driver licenses, hotel keys, parking passes, identification badges and the like.

The foldable circuit board may include an EMV chip reader. The EMV chip reader may be embedded within a chip reader surface area. The chip reader surface area may be coplanar with a first face associated with the foldable circuit board. For example, the first face may correspond to a first foldable OLED display. The first face may include the swipe surface area.

The magnetic read surface area may be coplanar with a second face associated with the foldable circuit board. For example, the second face may correspond to a second foldable OLED display. The second face may include a chip dip surface area. The first and second faces associated with the circuit board may be opposing faces.

The foldable circuit board may include an EMV chip reader and a magnetic read head. The EMV chip reader and the magnetic read head may both be embedded within the magnetic read surface area. The EMV chip reader and the magnetic read head may both be embedded within the chip reader surface area.

In operation, when the foldable OLED display is bent in a first direction about the fold axis, the magnetic read surface area may be positioned adjacent to a first swipe channel surface area to form a first swipe channel.

When the foldable OLED display is bent in a second direction about the fold axis, the chip reader surface area may be positioned adjacent to the chip dip surface area to form a chip dip channel.

The magnetic read surface area may include a first curved surface. The swipe surface area may include a second curved surface. When the magnetic read surface area is positioned adjacent to the swipe channel surface area to form the swipe channel, the first and second curved surfaces may form a guide path into the swipe channel.

The magnetic read surface area may include an elongated rib. The elongated rib may be offset from the first curved surface. The swipe surface area may include an elongated depression. The elongated depression may be offset from the second curved surface. In some embodiments, the swipe surface area may include an elongated rib and the magnetic read surface area may include an elongated depression. In operation, the elongated rib may be configured to fit within the elongated depression and provide a floor for the swipe channel.

When a purchasing instrument is inserted into the swipe channel, the floor may position a magnetic stripe on the purchasing instrument relative to the magnetic read head. The floor may position the magnetic stripe at a position relative to the magnetic read head so that the magnetic read head is optimally positioned to read information encoded on the magnetic stripe.

For example, on a typical plastic debit or credit card, a magnetic stripe is located 0.223 inches from an edge of the card, and is 0.375 inches wide. The floor may position the magnetic strip such that a middle of the middle magnetic stripe is aligned with the magnetic read head. The floor may also define a swipe channel height that limits an amount of tilt associated with the magnetic stripe as a card is moved through the swipe channel.

Apparatus for a foldable circuit board are provided. The foldable circuit board may include a display. The display may define a display surface area. The display may include an array of OLEDs. The array of OLEDs may form a bendable OLED display. The bendable OLED display may bend about a fold axis.

The foldable circuit board may include a magnetic read surface area. The foldable circuit board may include a magnetic read head. The magnetic read head may be embedded in the circuit board. The magnetic read head may be positioned within the magnetic read surface area.

The foldable circuit board may include a swipe channel surface area. The foldable circuit board may include a communication circuit. An illustrative communication circuit may be configured to transmit and receive data using one or more communication links. For example, the communication circuit may be configured to access a cellular network, WiFi networks, Bluetooth links or wired network connections.

The foldable circuit board may include a processor circuit. The processor circuit may include a non-transitory memory. The processor circuit may include a processor. The non-transitory memory may store machine executable instructions, that when executed by the processor, control electronic operation of the foldable circuit board.

The foldable circuit board may include a power source for powering the OLED display, the communication circuit, the magnetic read head and the processor circuit.

In operation, the bendable OLED display may be configured to fold about the fold axis. When the bendable OLED display is folded, the magnetic read surface area may be positioned adjacent to the swipe channel surface area. Positioning the magnetic read surface area adjacent to the swipe channel surface area may form a swipe channel. The swipe channel may be configured to receive a magnetic stripe. The magnetic stripe may be read by the magnetic read head.

For example, a swipe channel may be configured to receive a credit or debit card that includes information encoded on a magnetic stripe. The magnetic read head may be configured to read data encoded on the magnetic stripe as the magnetic stripe moves through the swipe channel.

The foldable circuit board may define a length. The foldable circuit board may define a width. The fold axis of the bendable OLED display may run parallel to the width. The fold axis of the bendable OLED display may run substantially parallel to the width.

The magnetic head may be configured to read data encoded on the magnetic stripe as the magnetic stripe moves in a direction that is substantially parallel to the width.

The foldable circuit board may include an elongated rib. The rib may be positioned within the magnetic read surface area. The rib may be substantially parallel to the width. The rib may be substantially parallel to the fold axis. The foldable circuit board may include an elongated depression. The depression may be positioned within the swipe channel surface area. The depression may be substantially parallel to the width. The depression may be substantially parallel to the fold axis.

In operation, when the bendable OLED display is bent about the fold axis, the elongated rib may be configured to fit within the elongated depression. In operation, when the bendable OLED display is bent about the fold axis, the rib, may space the magnetic read surface area apart from the swipe channel surface area. In operation, when the bendable OLED display is bent about the fold axis, the rib may provide a floor for the swipe channel.

The floor may define a depth or height of the swipe channel. The depth or height of the swipe channel may be measured from an edge of the foldable circuit board. The depth or height of the swipe channel may be measured from an edge of the bendable OLED display. The floor of the swipe channel may position a magnetic stripe on a debit/credit card relative to the magnetic read head. For example, for cards that conform to ISO 7810 and 7811, the floor may define a swipe channel that has a depth/height of at least 0.75 inches and no greater than 1.25 inches.

The fold axis may run parallel to the length of the foldable circuit board. The fold axis may run parallel to the length of the bendable OLED display. When the bendable OLED display is bent about the fold axis, the resulting swipe channel may position the magnetic head to read data encoded on a magnetic stripe as the magnetic stripe moves in a direction that is substantially parallel to the length.

The fold axis may run parallel to the width of the foldable circuit board. The fold axis may run parallel to the width of the bendable OLED display. When the bendable OLED display is bent about the fold axis, the resulting swipe channel may position the magnetic read head to read data encoded on a magnetic stripe as the magnetic stripe moves in a direction that is substantially perpendicular to the width.

The foldable circuit may include a first pair of mating features. The first pair of mating features may be positioned within the magnetic read surface area. The foldable circuit may include a second pair of mating features. The second pair of mating features may be positioned within the swipe channel surface area.

In operation, when the bendable OLED display is bent about the fold axis, the first pair of mating features is configured to mate with the second pair of mating features. Mating of the first and second pairs of mating features may space the magnetic read surface area apart from the swipe channel surface area. Mating of the first and second pairs of mating features may form at least two guide surfaces. The guide surfaces may direct a magnetic stripe, or a card that includes a magnetic stripe, past the magnetic read head.

The guide surfaces may be configured to guide the magnetic stripe, or a card that includes a magnetic stripe, past the magnetic read head such that a length of the magnetic stripe moves substantially perpendicular to the fold axis.

Methods for reading data encoded on magnetic stripe are provided. The magnetic stripe may be affixed to any suitable medium. For example, the magnetic stripe may be affixed to a plastic card, such as a debit or credit card. The magnetic stripe may be affixed to a paper parking ticket or airline boarding pass.

Methods may include forming a swipe channel by bending a foldable OLED display about a fold axis. Methods may include moving the magnetic stripe through the swipe channel and past a magnetic read head. Methods may include moving the magnetic stripe within the swipe channel at a speed of 3 to 60 inches per second. The swipe channel may position the magnetic stripe to be read by the magnetic read head.

Methods may include, using the magnetic head read, extracting data encoded on the magnetic stripe. Methods may include encrypting the extracted data. The data may be encrypted before transferring the data from the magnetic read head to another storage location. Methods may include transmitting the encrypted data to a remote server. For example, the encrypted data may be transmitted to a transaction processing network for authorization.

The swipe channel may define a central longitudinal axis. Methods may include moving the magnetic stripe substantially parallel to the central longitudinal axis. Methods may include moving the magnetic stripe substantially perpendicular to the central longitudinal axis.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus and/or method embodiment.

FIG. 1A shows an illustrative side view of circuit board 100. Circuit board 100 includes OLED layer 101. OLED layer 101 may form a thin, bendable OLED display with relatively lower power consumption than other display technology.

Circuit board 100 may include a touch sensor (not shown). The touch sensor may enable the circuit board to be responsive to user selections made by touching information displayed by OLED layer 101. In some embodiments, the touch sensor may not be greater than 0.001 mm thick. The touch sensor may be embedded within OLED layer 101. Integrating the touch sensor into OLED layer 101 may reduce reflectivity due to any space between the touch sensor and OLED layer 101. Reducing reflectivity may increase visibility of information presented using OLED layer 101.

Using OLED layer 101 to display information may provide several technical advantages. OLED displays typically have lower power consumption, wider viewing angles, better colors, higher contrast, operate in a wider temperature ranges and enable faster refresh rates than other display technology. In some embodiments, OLED displays may be fabricated directly on control circuitry. OLED displays may only include trace amounts of heavy metals. Thus, when disposed of, OLED display may be less harmful to the environment than other display technology.

Circuit board 100 includes solar panel layer 103. Solar panel 103 may be a power source for components of circuit board 100. OLED displays may be transparent when not illuminated. Thus, when OLED layer 101 is not illuminated, OLED layer 101 may be transparent. Sunlight may pass through OLED layer 101 and reach solar panel layer 103. Solar panel layer 103 may convert solar energy into electricity that powers one or more components of circuit board 100. Solar panel layer 103 may be thin enough to be flexible. In some embodiments, a solar layer may be positioned on a surface of circuit board 100 that is not covered by an OLED layer.

OLED layer 101 and/or solar panel layer 103 may flex or bend.

Circuit board 100 includes battery 105. Battery 105 may be rechargeable. Battery 105 may be flexible. Battery 105 may be recharged by power generated by solar panel layer 103. Battery 105 may be rechargeable from a power source external to circuit board 100.

Circuit board 100 includes software chip 109. Software chip 109 may control overall operation of circuit board 100 and its associated components. Software chip 109 may include a processor circuit. Software chip 109 may include a non-transitory memory. Circuit board 100 may include transitory and non-transitory memory locations (not shown) within thickness 113. Software chip 109 may access such memory locations. The memory locations may store instructions, that when executed by software chip 109, cause circuit board 100 to perform various functions.

For example, memory locations may store software used by circuit board 100, such as an operating system, application programs and an associated database.

Circuit board 100 includes communication chip 111. Communication chip 111 may be a communication circuit. Communication chip 111 may provide circuit board 100 with wireless communication functionality. Communication chip 111 may provide circuit board 100 with wired communication functionality. Communication chip 111 may enable circuit board 100 to communicate using a variety of communication protocols including, Wi-Fi, Bluetooth, Ethernet, near field communication ("NFC") and cellular telecommunications.

Circuit board 100 also includes pressure sensitive button 107. Pressure sensitive button 107 may be mechanically actuated. Actuation of pressure sensitive button 107 may provide an electronic signal to software chip 109 or any other component of circuit board 100.

For example, mechanical actuation of pressure sensitive button 107 may power-on and/or power-off software chip 109. Mechanical actuation of pressure sensitive button 107 may inform software chip 109 of a user's selection of choices displayed using OLED layer 101.

Circuit board 100 includes magnetic read head 114. In some embodiments, magnetic read head may extend beyond OLED layer 101. Magnetic read head may be mounted on circuit board 100 using one or more springs (not shown). The springs may bias magnetic read 114 head for contact with a magnetic stripe. An exemplary spring may press magnetic read head 114 against a magnetic stripe with a force of 5 to 8 ounces when the magnetic stripe is inserted into a swipe channel and passes magnetic read head 114. Magnetic read head 114 may be positioned on circuit board such that when OLED layer 101 is bent about a fold axis, magnetic read head 114 is positioned within a swipe channel.

FIG. 1A shows illustrative components 101-114 of circuit board 100 in an arrangement within a thickness of circuit board 100. The arrangement shown in FIG. 1A is illustrative. Circuit board 100 may include additional components not shown in FIG. 1A, such as a biometric sensor. For example, pressure sensitive button 107 may include a fingerprint reader that captures a user's fingerprint when button 107 is actuated.

One or more of components 101-114, and any additional components, may be arranged within circuit board 100 in any suitable fashion. Some embodiments may not include all of components 101-114. For example, a circuit board may not include solar panel layer 103 or pressure sensitive button 107.

Figure 1B:
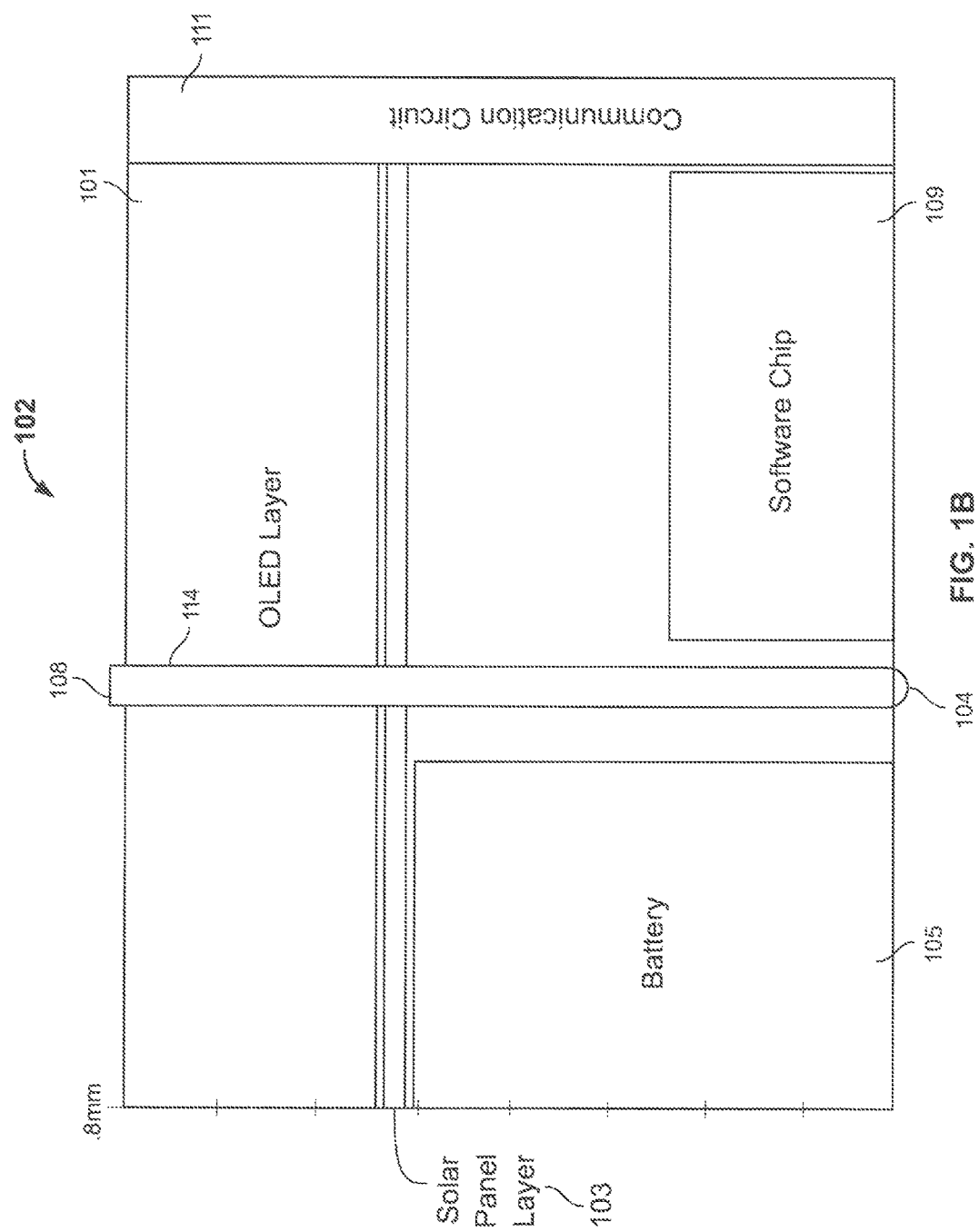
FIG. 1B shows illustrative apparatus in accordance with principles of the disclosure.

FIG. 1B shows illustrative view 102 of a circuit board having an exemplary thickness of 0.8 mm. View 102 shows exemplary thicknesses of components 101-111. View 102 shows that in some embodiments, magnetic read head 114 may include a portion 104 that protrudes from a surface of a circuit board. In some embodiments, magnetic read head 114 may include a portion 108 that that protrudes from a surface of a circuit board. In some embodiments, magnetic read head 114 may be positioned below a surface of a circuit board.

Figure 2:
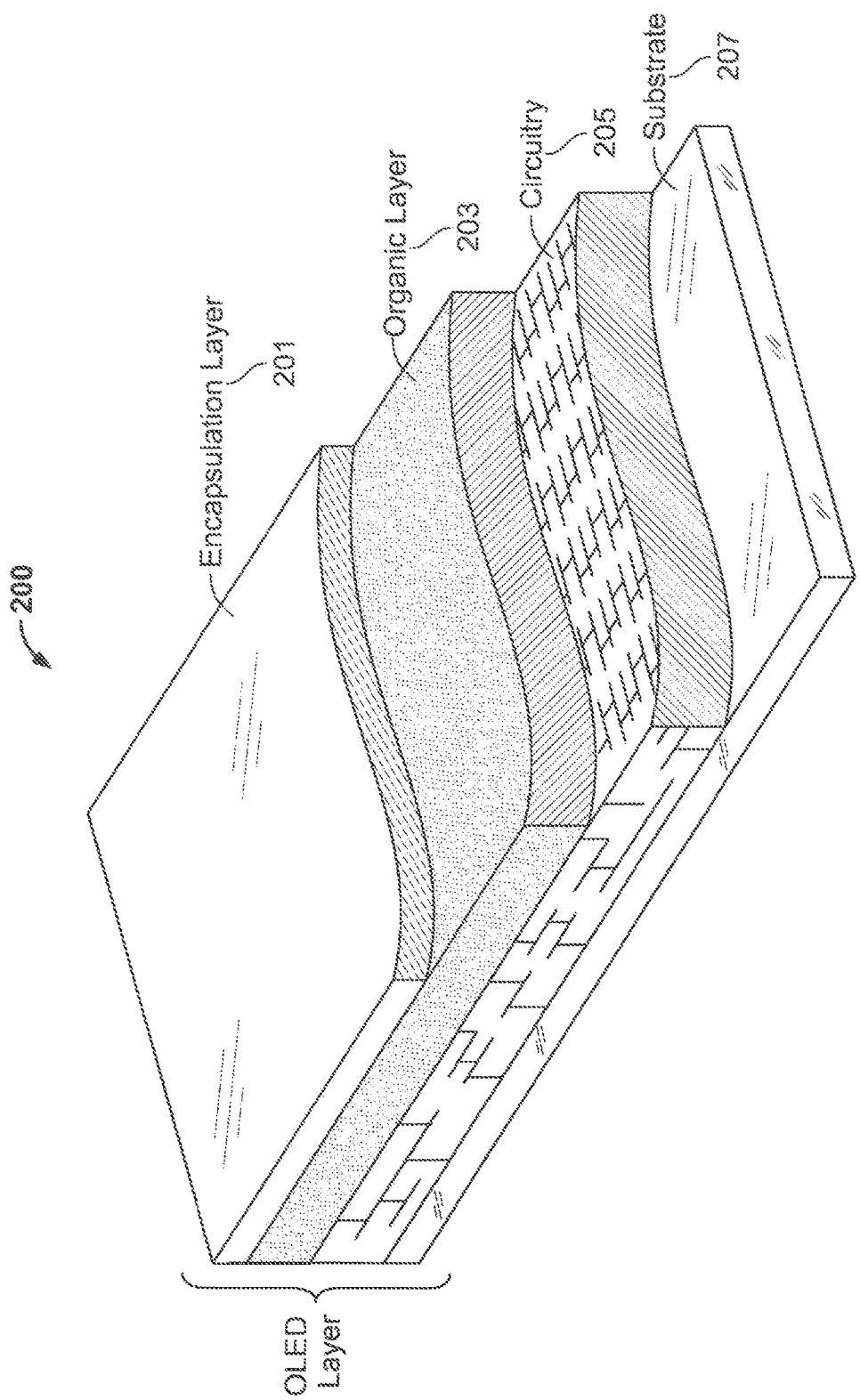
FIG. 2 shows illustrative apparatus in accordance with principles of the disclosure.

FIG. 2 shows structures 200 of an illustrative OLED layer, such as OLED layer 101 (shown in FIG. 1A). Structures 200 include four layers: encapsulation layer 201, organic layer 203, circuitry layer 205 and substrate layer 207.

Encapsulation layer 201 protects the OLED layer from exposure to oxygen, water and other contaminants. Preferably, encapsulation layer 201 is flexible and transparent. Glass is an exemplary material that may be used to construct encapsulation layer 201. When glass is used to construct encapsulation layer 201, the glass may be very thin and flexible. For example, the glass may be between 50 micrometers ("µm") and 100 µm thick.

In some embodiments, encapsulation layer 201 may be constructed using thin-film encapsulation techniques such as Atomic Layer Deposition ("ALD"). ALD is a process that utilizes chemicals that, when deposited on a material, react to create a solid, thin film.

Structures 200 include organic layer 203. Organic layer 203 typically includes an emissive solid-state semiconductor. Organic layer 203 may be constructed from a thin film of organic (carbon-based) material. For example, organic layer 203 may include one or more OLEDs or an array of OLEDs. When electricity is applied to an OLED within organic layer 203, electrons flow through organic layer 203 and release photons, thereby emitting light. Different types of emissive materials may be used. Each type of material may be associated with a different color light. An intensity of light emitted by organic layer 203 may be controlled by the amount of electricity flowing through organic layer 203.

Organic layer 203 may be doped with "host" materials. Host material may affect a property, such as power efficiency, of organic layer 203. For example, organic layer 203 may be doped with materials that improve its operation and/or achieve a desired color.

Organic layer 203 may include two or more sub-layers (not shown). For example, organic layer 203 may include 5, 10 or 15 sublayers. Illustrative sub-layers may include: (1) an electron transport layer, (2) a blocking layer, (3) an emissive layer, (4) a hole transport layer and (5) an injection layer.

An emissive layer may be placed between a cathode and an anode. When electricity is applied, electrons flow from the cathode to the anode. OLED displays may be driven by electrical current or voltage. In a preferred embodiment, the OLED display is driven by current. The cathode inserts electrons into the emissive layer, and the anode removes the electrons. Electron "flow" through the emissive layer releases photons, generating light. The color of the generated light may be changed by including different types of materials within the emissive layer.

A direction of light emitted by organic layer 203 may be controlled by a degree of transparency of the anode and/or cathode. In some embodiments, a cathode may be reflective. A reflective cathode may preferably be constructing using an aluminum based-compound or lithium fluoride. An anode may be transparent. A transparent anode may preferably be constructed using indium tin oxide. In such embodiments, when current flows between the cathode and anode, light is emitted through circuitry layer 205 and substrate layer 207. Circuitry layer 205 and substrate layer 207 may be transparent. Such embodiments may be referred to as "bottom-emitting OLEDs."

In some embodiments, the cathode may be transparent. A transparent cathode may preferably be constructed using indium tin oxide. The anode may be reflective. A reflective anode may direct light toward the transparent cathode. Such embodiments may be referred to as "top-emitting OLEDs." Typically, top-emitting designs are more efficient and are used to construct higher resolution OLED displays.

Additionally, top-emitting designs may allow organic layer 203 to be formed on a non-transparent substrate. Small- and medium-sized OLED displays (e.g., 1-7 inches) are typically constructed using top-emitting techniques.

Organic layer 203 may include one or more pixels. Different architectures are available for forming OLED pixels. One exemplary architecture includes positioning different color (e.g., red, green and blue) OLEDs adjacent to each other. Another exemplary architecture includes stacking different color OLEDs on top of each other. OLEDs may be stacked because materials used to construct organic layer 203 may be transparent. A stacked design may provide a smaller pixel size and higher resolution.

Structures 200 include circuitry layer 205. Circuitry layer 205 includes electronics that drive one or more pixels formed within organic layer 203. Preferably, amorphous silicon ("a-Si") and low temperature polysilicon ("LTPS") may be used to construct circuitry layer 205. In some embodiments, circuitry layer 205 may be transparent.

Substrate layer 207 supports circuitry layer 205, organic layer 203 and encapsulation layer 201. Substrate layer 207 may be constructed using various materials. For example, substrate layer 207 may be constructed using glass, plastic or metal materials. In some embodiments, such as in bottom-emitting OLEDs, substrate layer 207 may function as encapsulation layer 201.

Figure 3:
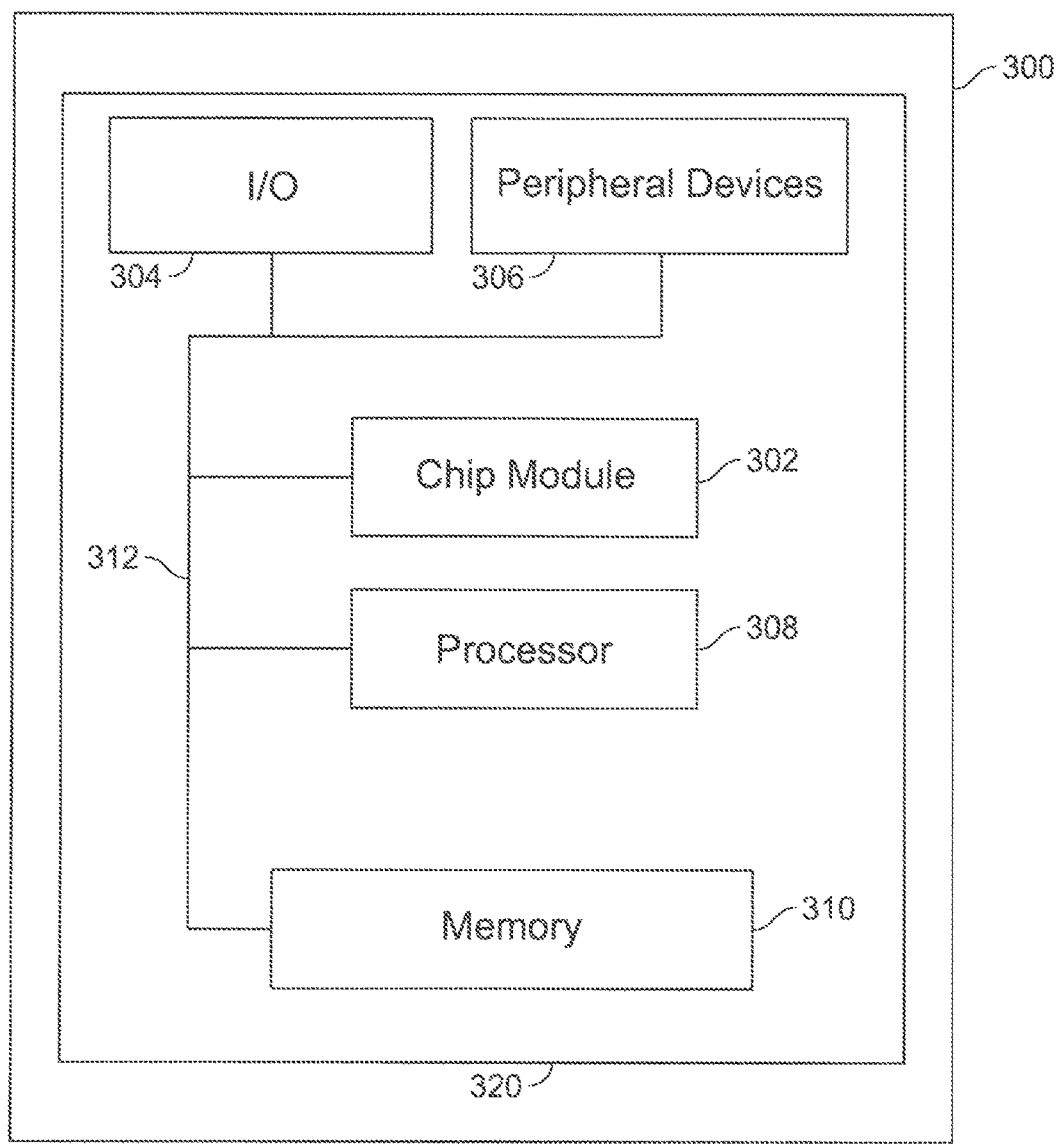
FIG. 3 shows illustrative apparatus in accordance with principles of the disclosure.

FIG. 3 shows illustrative software chip 300. Software chip 300 may include one or more features of software chip 109 (shown in FIG. 1A). Software chip 300 may include chip module 302, which may include one or more integrated circuits, and which may include logic configured to perform any suitable logical operation.

Software chip 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable encoded media or devices; peripheral devices 306, which may include counter timers, real-time timers, power-on reset generators or any other suitable peripheral devices; logical processing device 308, which may compute data structural information, structural parameters of the data or perform logical operations; and machine-readable memory 310.

Machine-readable memory 310 may be configured to store, in machine-readable data structures: data extracted from a magnetic stripe or EMV chip, location information, transaction histories, electronic signatures of biometric features or any other suitable information or data structures.

Components 302, 304, 306, 308 and 310 may be coupled together by a system bus or other interconnections 312 and may be present on one or more circuit boards such as circuit board 320. In some embodiments, the components may be integrated into a single chip. The chip may be silicon-based.

FIGS. 4-9 show illustrative layers that may be present within an illustrative circuit board.

Figure 4:
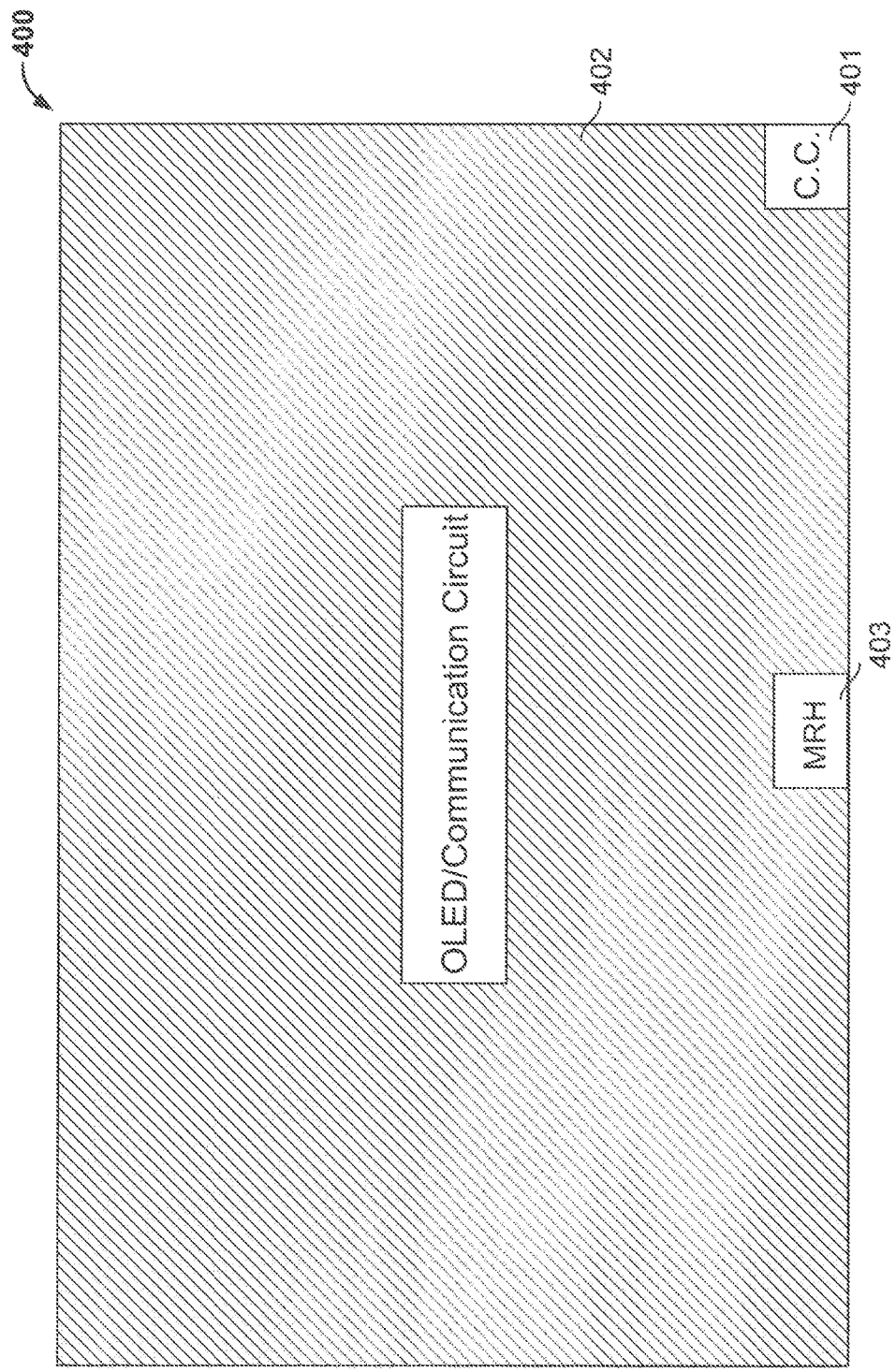
FIG. 4 shows illustrative apparatus in accordance with principles of the disclosure.

FIG. 4 shows illustrative layer 400. Layer 400 includes OLED layer 402 (such as OLED layer 200, shown in FIG. 2). FIG. 4 shows that, in some embodiments, communication circuit 401 may penetrate layer 400. FIG. 4 shows that, in some embodiments, magnetic read head 403 may penetrate layer 400.

Figure 5:
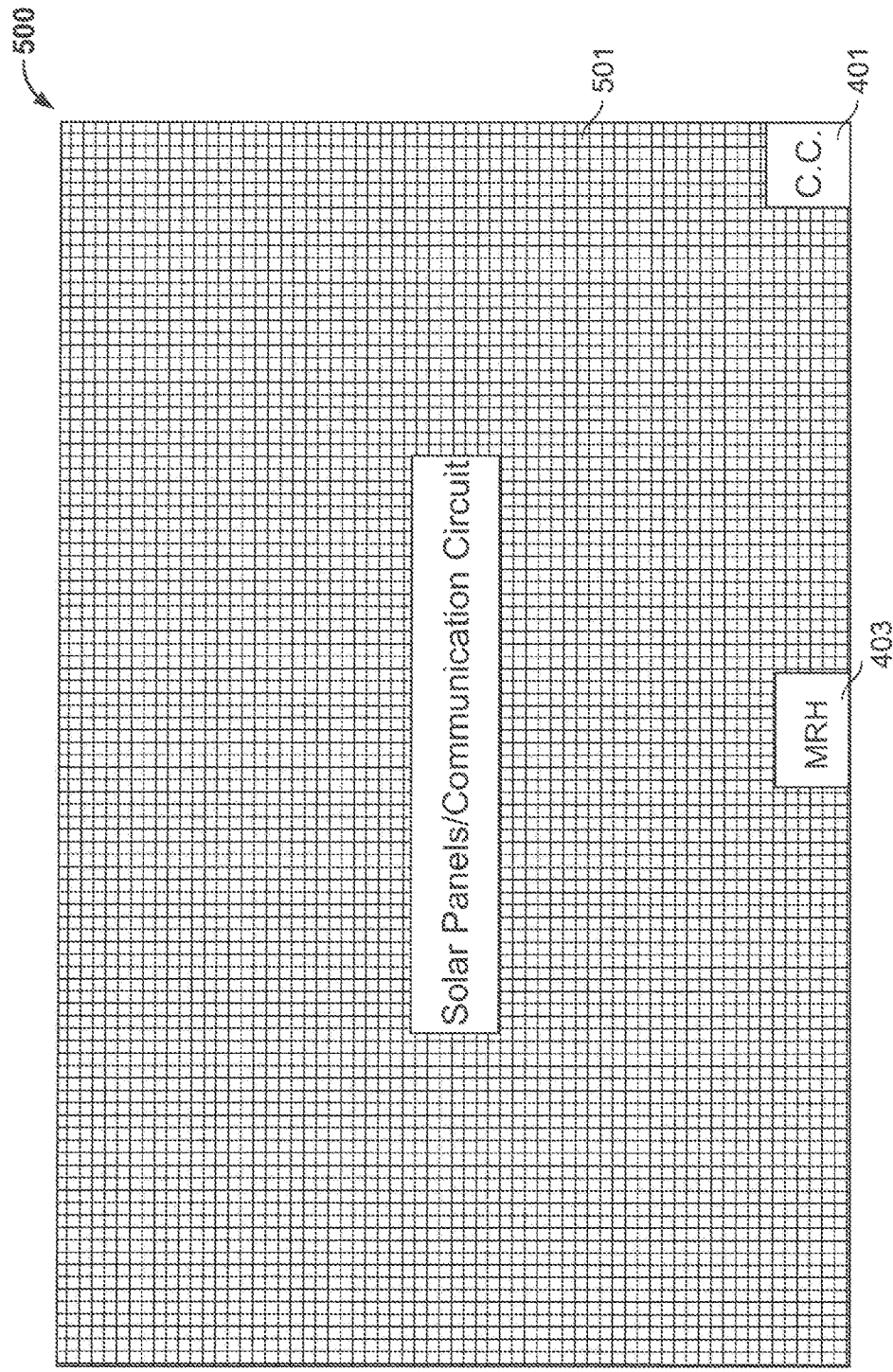
FIG. 5 shows illustrative apparatus in accordance with principles of the disclosure.

FIG. 5 shows illustrative layer 500. Layer 500 includes solar cells or panels 501 that may be used to power various components of a circuit board (e.g., circuitry layer 205, shown in FIG. 2). FIG. 5 shows that, in some embodiments, communication circuit 401 may penetrate layer 500. FIG. 5 shows that, in some embodiments, magnetic read head 403 may penetrate layer 500.

Figure 6:
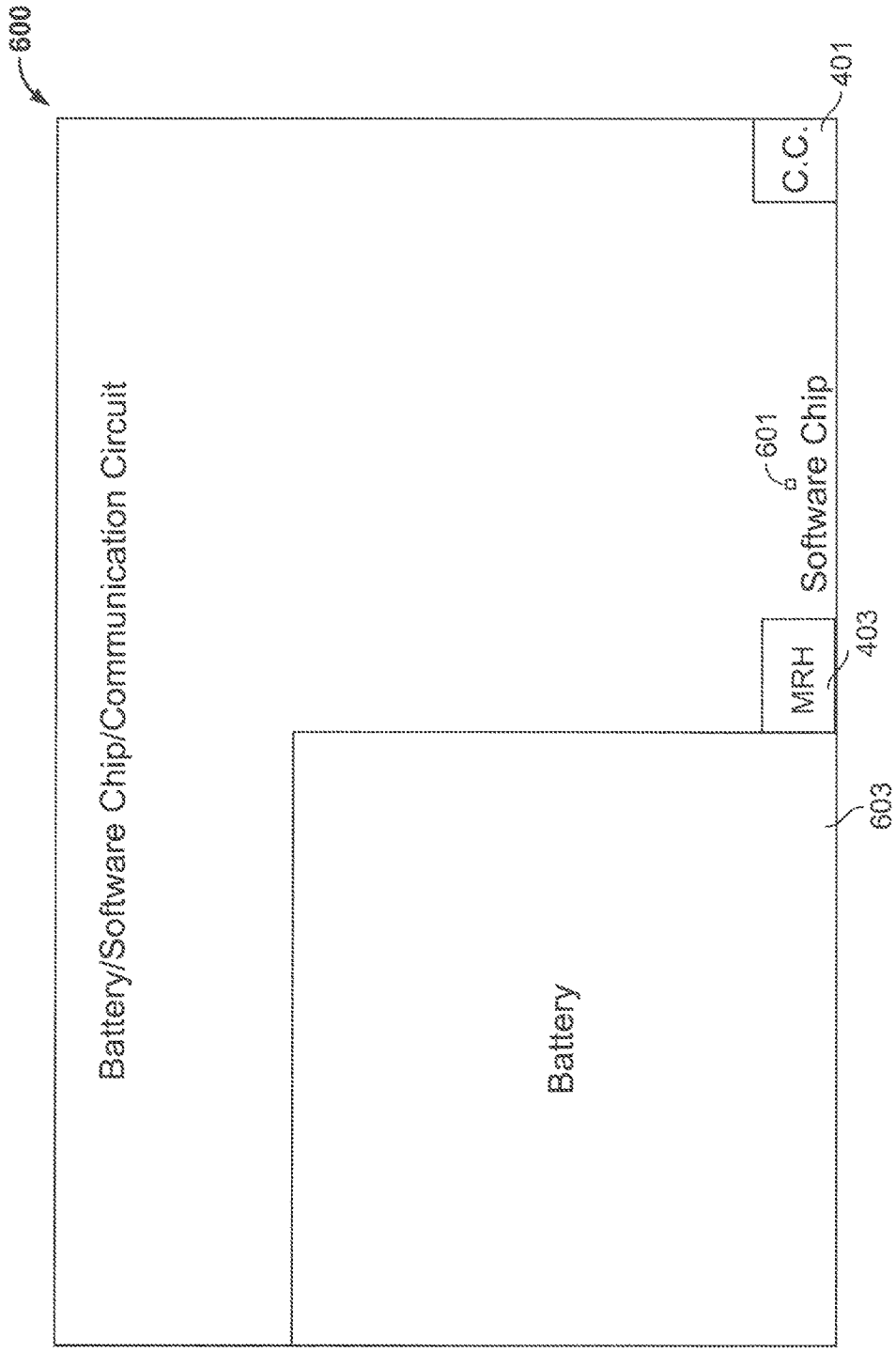
FIG. 6 shows illustrative apparatus in accordance with principles of the disclosure.

FIG. 6 shows illustrative layer 600. Layer 600 includes software chip 601. Software chip 601 may include one or more features of software chip 109 (shown in FIG. 1). Layer 600 includes battery 603. Battery 603 may include one or more features of battery layer 105 (shown in FIG. 1). FIG. 6 shows that, in some embodiments, communication circuit 401 may penetrate layer 600. FIG. 6 shows that, in some embodiments, magnetic read head 403 may penetrate layer 600.

Figure 7:
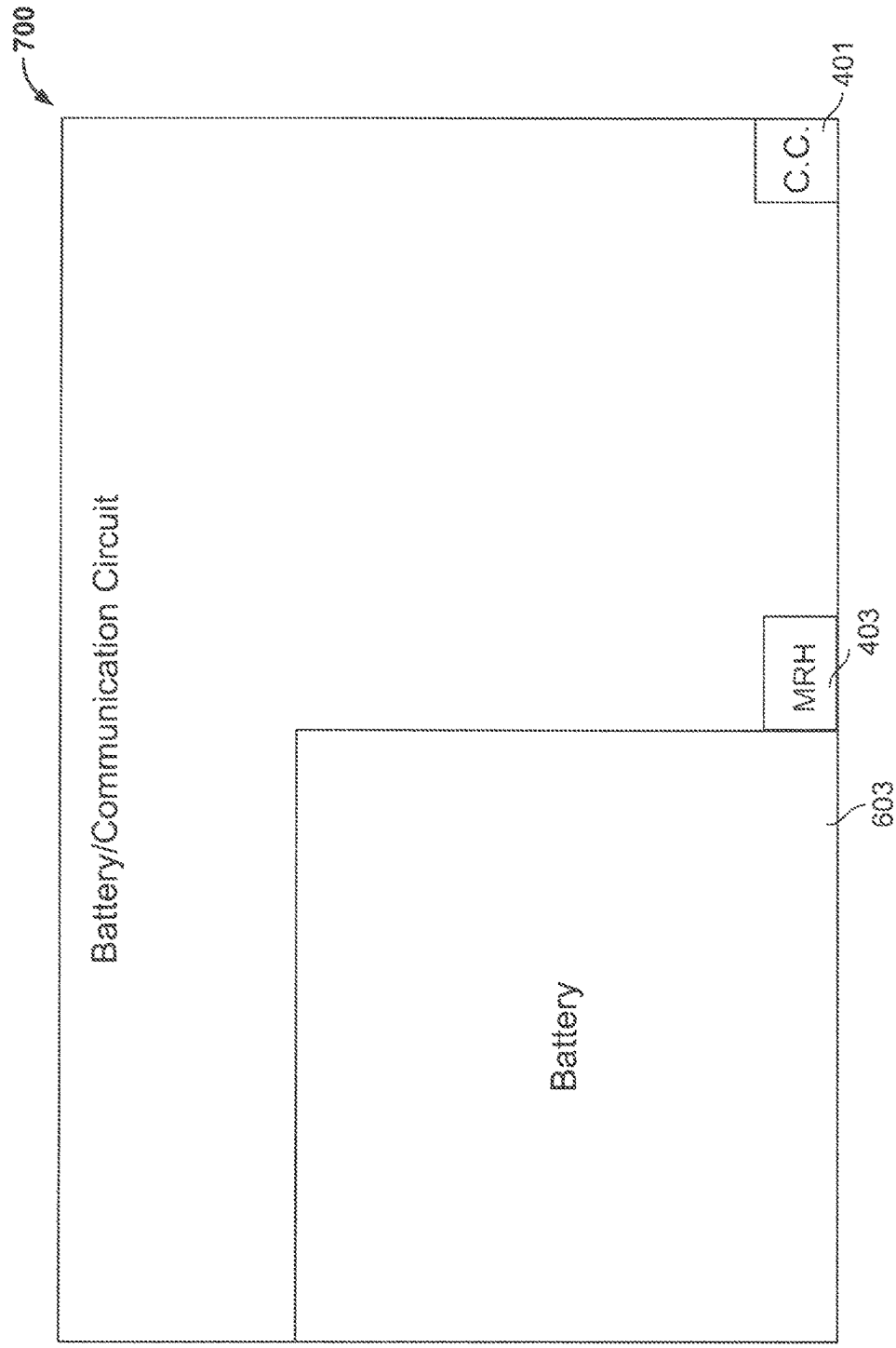
FIG. 7 shows illustrative apparatus in accordance with principles of the disclosure.

FIG. 7 shows illustrative layer 700. FIG. 7 shows that, in some embodiments, battery 603 may penetrate layer 700. FIG. 7 shows that, in some embodiments, communication circuit 401 may penetrate layer 700. FIG. 7 shows that, in some embodiments, magnetic read head 403 may penetrate layer 700.

Figure 8:
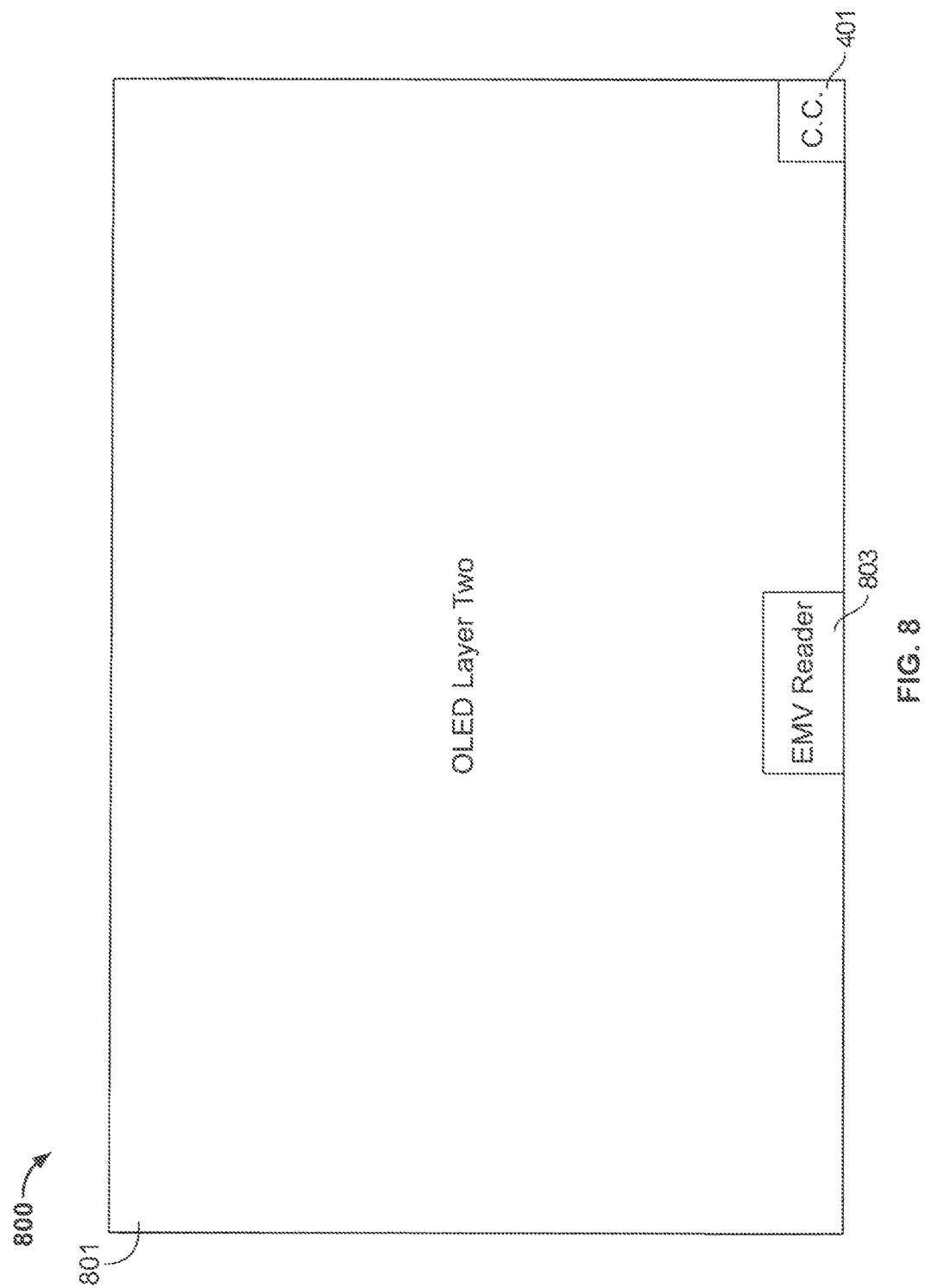
FIG. 8 shows illustrative apparatus in accordance with principles of the disclosure.

FIG. 8 shows illustrative layer 800. Layer 800 includes a second OLED layer 801. Second OLED layer 801 may include one or more features of OLED layer 200 (shown in FIG. 2). Second OLED layer 801 may allow front and back faces of a circuit board to include a bendable OLED display. FIG. 8 also shows that communication circuit 401 may penetrate layer 800. FIG. 8 also shows that an EMV chip reader may penetrate layer 800.

A foldable circuit board may be bent in a first direction about a fold axis to position magnetic read head 403 adjacent to a first swipe surface area to form a first swipe channel. A magnetic stripe may be passed through the channel and close enough to (or touching) magnetic read head 403 so that magnetic read head 403 may read data encoded on the magnetic stripe.

A foldable circuit board may be bent in a second direction about the fold axis to position EMV chip reader 803 adjacent to a second swipe surface area to form a second swipe channel. The second swipe channel may be configured to position an EMV chip adjacent to EMV chip reader 803 so that EMV chip reader 803 may read data encoded on the EMV chip.

Figure 9:
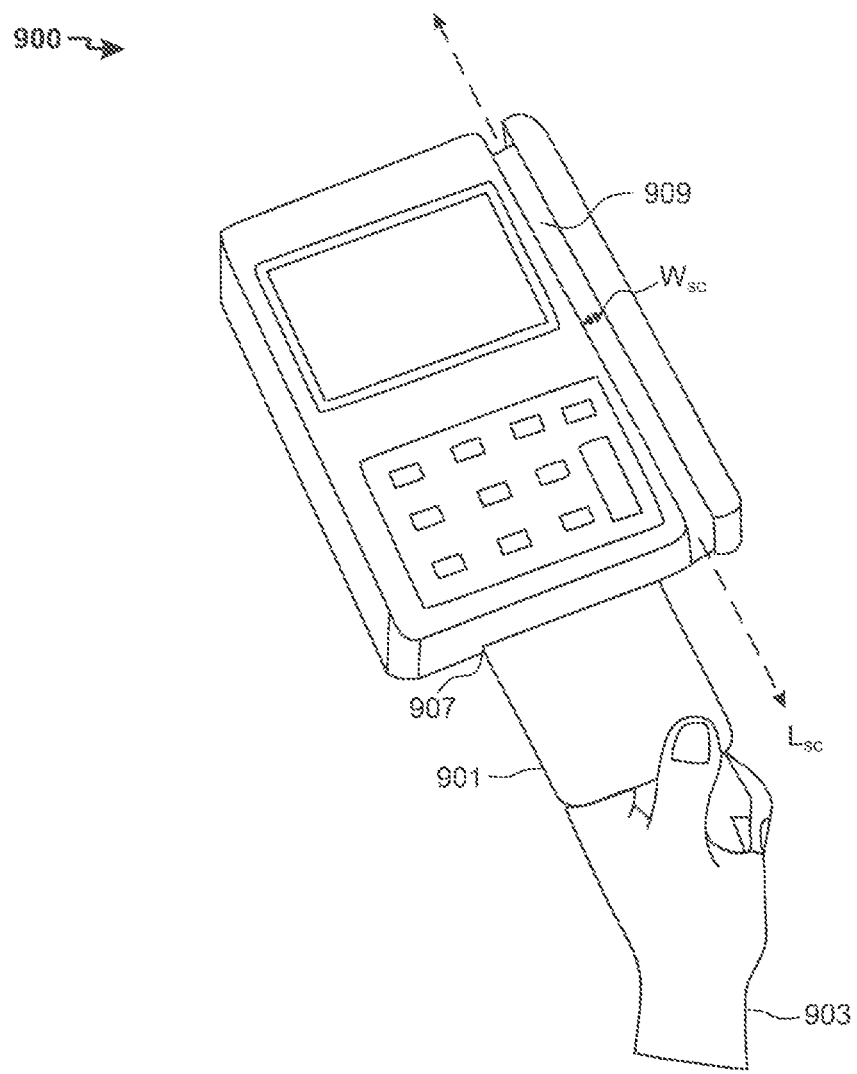
FIG. 9 shows an illustrative apparatus in accordance with principles of the disclosure.

FIG. 9 shows illustrative card reader 900. Card reader 900 includes swipe channel 909. Swipe channel 909 is configured to receive a magnetic stripe (not shown). Swipe channel 909 has width $W_{sc}$ and a length that defines longitudinal axis $L_{sc}$.

Card 901 may include a magnetic stripe (not shown). Card 901 may be inserted into swipe channel 909 and moved by user 903 along $L_{sc}$. As card 901 moves along $L_{sc}$, a magnetic read head embedded in device 901 may extract data encoded on the magnetic stripe.

Card 901 may include an EMV chip (not shown). User 903 may insert card 901 into swipe channel 907 to read data stored on the EMV chip. Card 901 may remain stationary while data is being read from the EMV chip.

Figure 10:
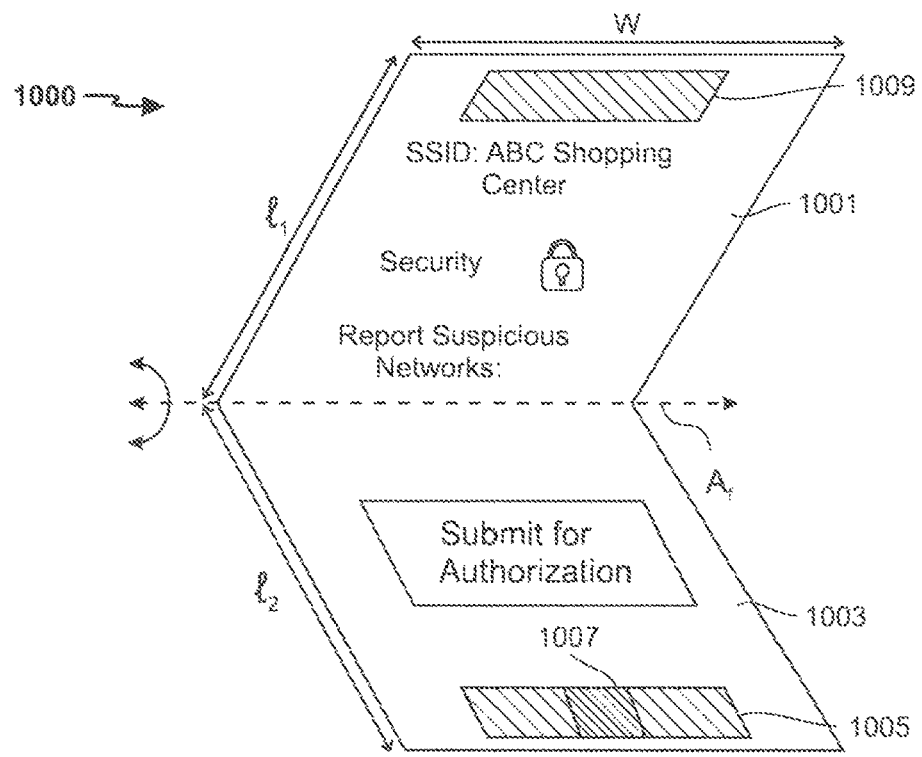
FIG. 10 shows illustrative apparatus in accordance with principles of the disclosure.

FIG. 10 shows illustrative apparatus 1000. Apparatus 1000 may be a mobile device such as a smart phone or tablet. Apparatus 1000 may include a bendable OLED display on face 1001. FIG. 10 shows illustrative information displayed on face 1001. Apparatus 1000 may include a bendable OLED display on face 1003. FIG. 10 shows illustrative information displayed on face 1003. A contiguous, bendable OLED display may cover both face 1001 and face 1003.

Apparatus 1000 has a width W. Face 1001 has a length $l_1$. Face 1003 has a length $l_2$. A total unfolded, length of apparatus 1000 may be $l_1+l_2$. Apparatus 1000 has a fold axis $A_f$. Fold axis $A_f$ extends parallel to width W. FIG. 10 shows that apparatus 1000 is bendable about axis $A_f$.

Apparatus 1000 includes magnetic read surface area 1005. A magnetic read head, such as magnetic read head 1007 is positioned within magnetic read surface area 1005. Apparatus 1000 includes swipe surface area 1009. When apparatus 1000 is folded about axis $A_f$, face 1001 may be positioned adjacent to face 1003 to form a swipe channel. When apparatus 1000 is folded about axis $A_f$ and a swipe channel formed, magnetic read head 1007 may touch swipe surface area 1009. A length of the swipe channel may correspond to width W.

Figure 11:
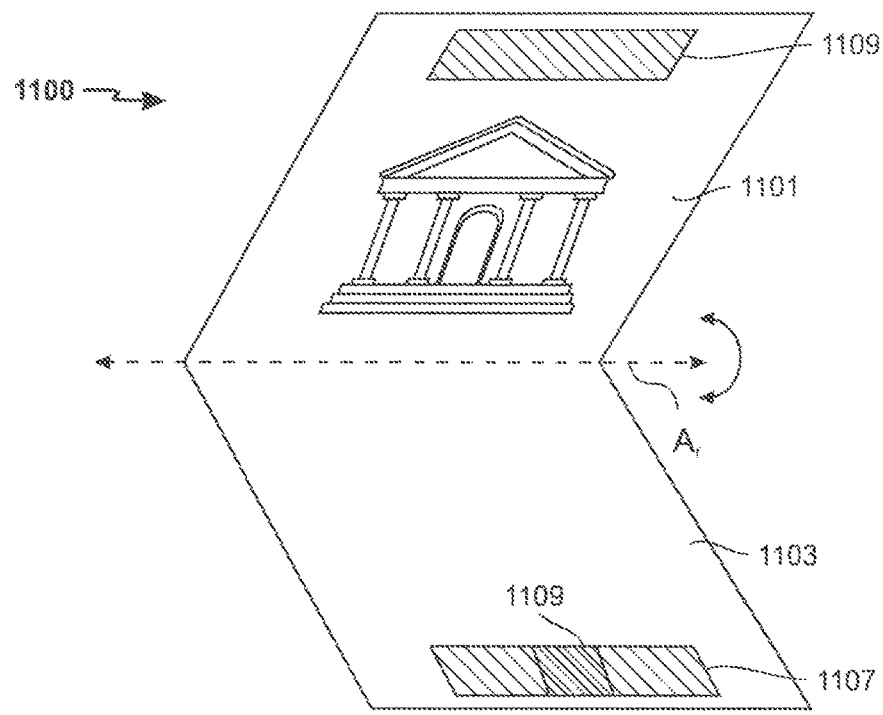
FIG. 11 shows illustrative apparatus in accordance with principles of the disclosure.

FIG. 11 shows illustrative view 1100 of apparatus 1000 (shown in FIG. 10). FIG. 11 shows face 1101 of apparatus 1000. Face 1101 may correspond to an opposing side of face 1001 (shown in FIG. 10). Face 1101 may include a bendable OLED display. Face 1101 includes chip dip surface area 1109.

FIG. 11 shows face 1103 of apparatus 1000. Face 1103 may correspond to an opposing side of face 1003 (shown in FIG. 10). Face 1103 may include a bendable OLED display. Face 1103 includes chip reader surface area 1107. Chip reader surface area 1107 includes chip reader 1109. Chip reader 1109 may be an EMV chip reader.

In some embodiments, face 1103 may include a magnetic read surface area such as magnetic read surface area 1005 including magnetic read head 1007 (both shown in FIG. 10).

FIG. 11 shows that when apparatus 1000 is folded in a second direction about axis Af, a second swipe channel may be formed by positioning chip reader area 1107 adjacent to chip dip surface area 1109. The second swipe channel may be formed when chip reader 1109 contacts, or is positioned adjacent to, chip dip surface area 1109. The second swipe channel may be a chip dip channel.

Figure 12:
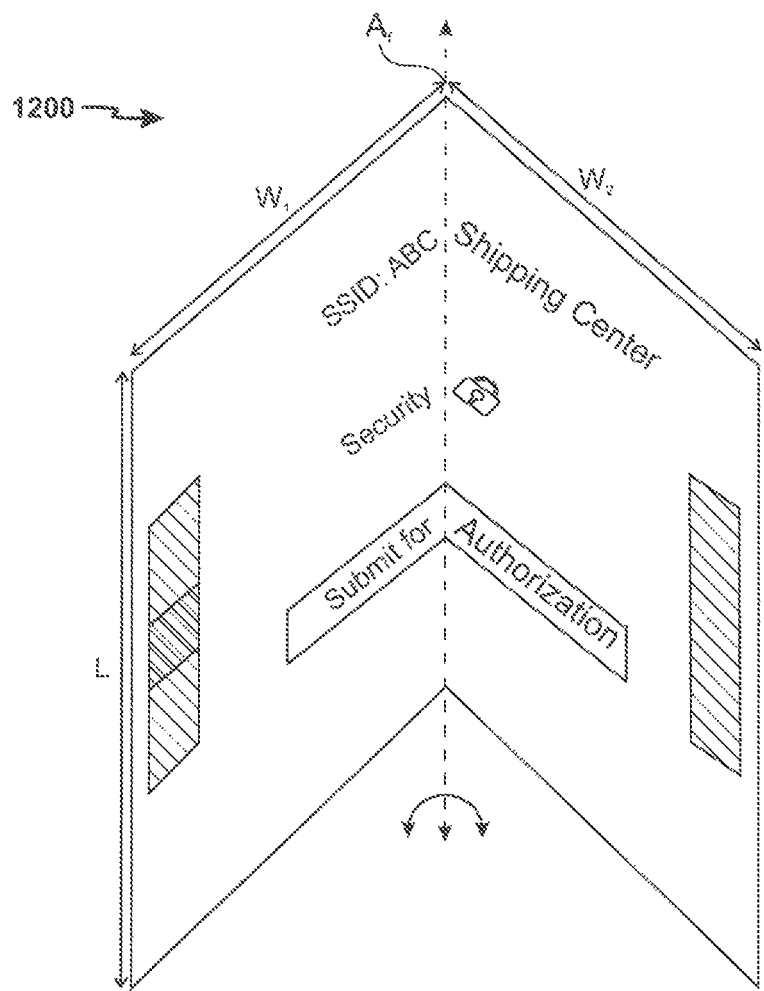
FIG. 12 shows illustrative apparatus in accordance with principles of the disclosure.

FIG. 12 shows illustrative apparatus 1200. Apparatus 1200 may include one or more features of apparatus 1000 (shown in FIGS. 10 and 11). FIG. 12 shows that apparatus 1200 may be folded about axis $A_f$. FIG. 12 shows that axis $A_f$ runs parallel to length L of apparatus 1200. FIG. 12 shows that axis $A_f$ runs perpendicular to a width ($W_1$ or $W_2$) of apparatus 1200. Apparatus 1200 may be folded about axis $A_f$ to form a swipe channel.

In some embodiments, apparatus 1200 may include an optical device reader. The optical device reader may be configured to read information displayed within a quick-response ("QR") code. The QR code may be read when a payment instrument is inserted into a swipe or chip dip channel.

Figure 13:
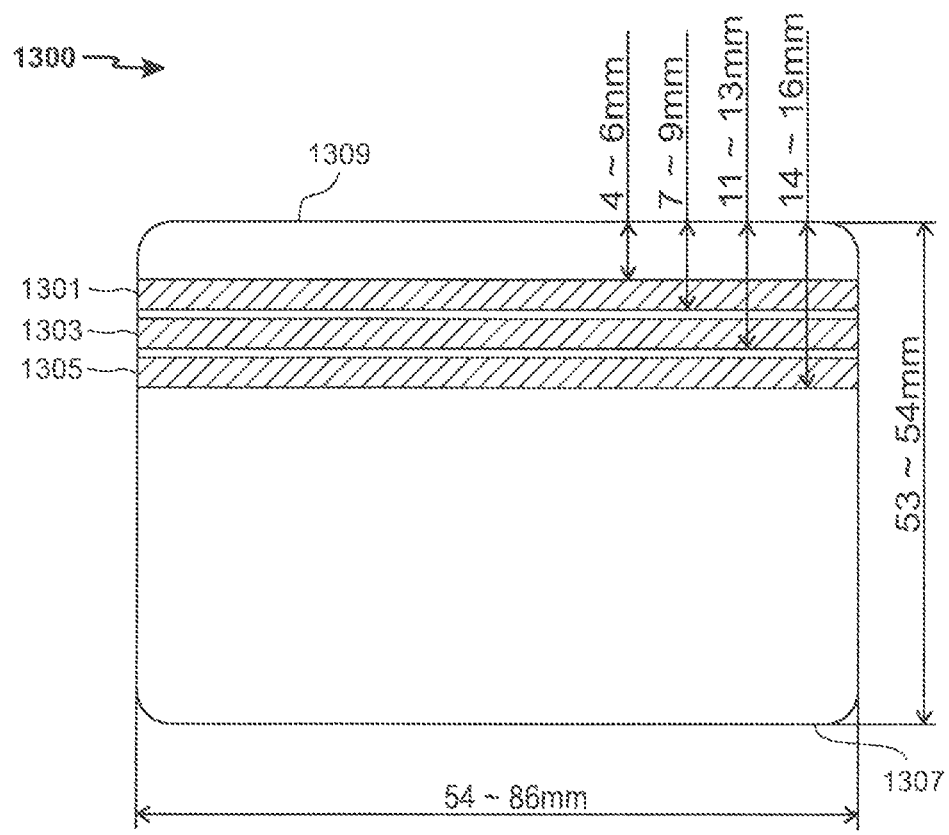
FIG. 13 shows illustrative apparatus in accordance with principles of the disclosure.

FIG. 13 shows illustrative purchasing instrument 1300. Purchasing instrument includes edge 1309. Purchasing instrument includes edge 1307. Purchasing instrument 1300 includes a magnetic stripe that includes track 1301, track 1303 and track 1305. Track 1301 is positioned a fixed distance from edge 1309. Track 1303 is positioned a fixed distance from edge 1309. Track 1305 is positioned a fixed distance from edge 1309.

Each of tracks 1301-1305 may be positioned a fixed distance from edge 1307.

A depth of a swipe channel may be sufficient to read data encoded on one or more of tracks 1301-1305. A length of a swipe channel may be sufficient to read data encoded on one or more of tracks 1301-1305. For example, an exemplary swipe channel may have a depth of 16 mm and a length of 86 mm.

Figure 14A:
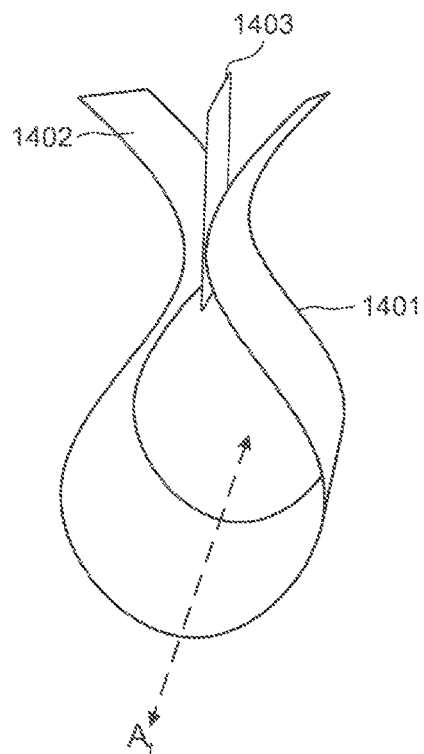
FIGS. 14A-14D show illustrative apparatus in accordance with principles of the disclosure.

FIG. 14A shows illustrative foldable circuit board 1401. FIG. 14A shows circuit board 1401 bent about axis $A_f$ and forming a swipe channel to read data on card 1403. FIG. 14A shows that foldable circuit board 1401 includes curved surface 1402. Curved surface 1402 may provide a guide path that directs card 1403 into the swipe channel.

Figure 14B:
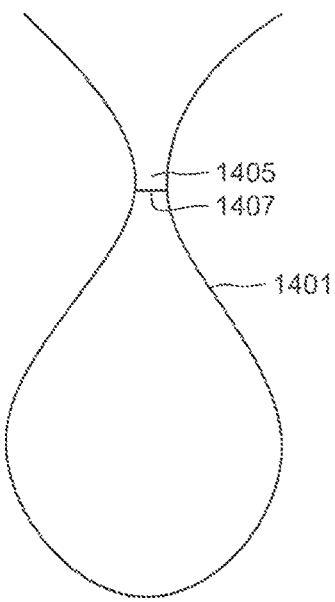

FIG. 14B shows another embodiment of foldable circuit board 1401. FIG. 14B shows swipe channel 1405. FIG. 14B shows that swipe channel 1405 includes floor 1407. Floor 1407 may space a chip reader surface area (e.g., 1107, shown in FIG. 11) apart from a chip dip surface area (e.g., 1109, shown in FIG. 11).

Floor 1407 may space a magnetic read surface area (e.g., 1005, shown in FIG. 10) apart from a swipe surface area (e.g., 1009, shown in FIG. 10). Floor 1407 may be formed when an elongated rib (not shown) mates with a corresponding depression (also not shown).

Figure 14C:
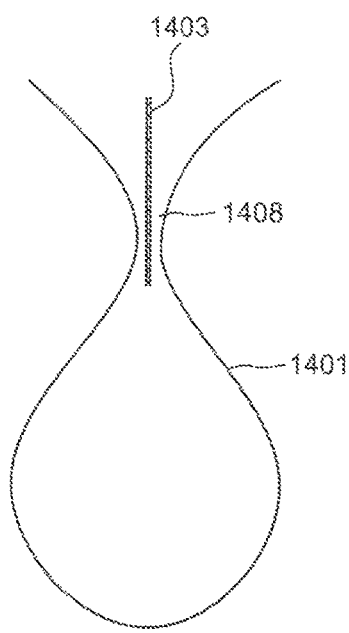

FIG. 14C shows another shows another view of foldable circuit board 1401 shown in FIG. 14A. FIG. 14C shows another view of card 1403 positioned in swipe channel 1408. Swipe channel 1408 may include one or more feature of swipe channel 1405 (shown in FIG. 14B).

Figure 14D:
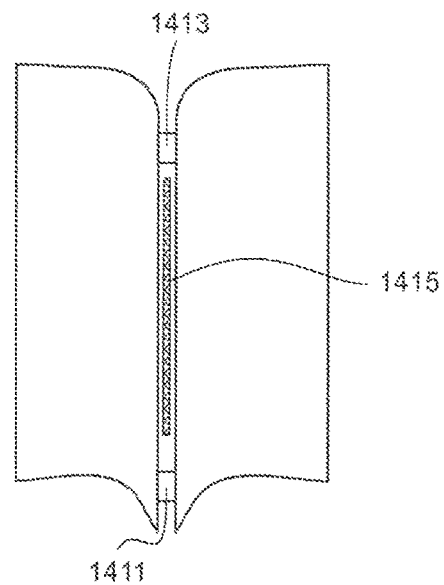

FIG. 14D shows card 1415 inserted into a chip dip channel. The chip dip channel may be formed when a foldable circuit board is bent about a fold axis. When the foldable circuit board is bent about the fold axis, features 1413 and 1411 may form a "mouth" for the chip dip channel.

Feature 1413 may be a protrusion in a first face of a foldable circuit board. Feature 1413 may fit into a corresponding depression (not shown) in an opposing face (when the circuit board is bent about a fold axis) of the circuit board.

A chip dip channel may include floor. A chip dip channel may position card 1415 to be read by a chip reader, such as chip reader 1109 (shown in FIG. 11).

Figure 15:
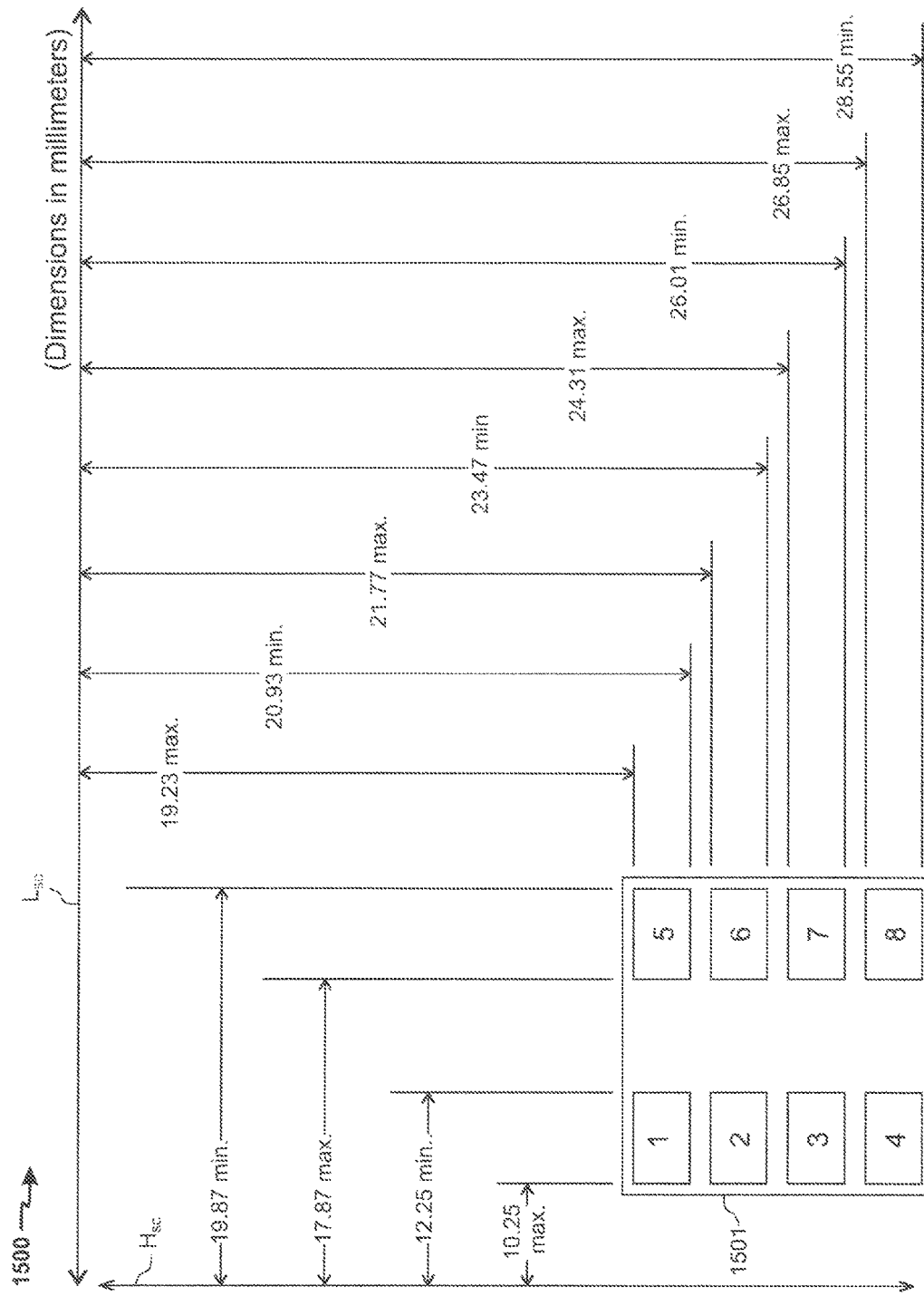
FIG. 15 shows illustrative apparatus in accordance with principles of the disclosure.

FIG. 15 shows an illustrative segment 1500 of an illustrative chip dip channel. Segment 1500 includes channel depth $H_{sc}$. A length of segment 1500 may run along longitudinal axis $L_{sc}$.

Segment 1500 shows chip reader 1501. Chip reader 1501 comprises 8 sub-heads. Each sub-head is positioned a specific distance from $L_{sc}$ and $H_{sc}$. Each sub-head may be configured to read data on a target location of a chip, such as an EMV chip. The sub-heads may be positioned based on target location of a chip defined in ISO 7816, which is hereby incorporated herein by reference in its entirety. A foldable circuit board may be configured to bend about a fold axis and form a chip dip channel such that chip reader 1501 (and associated sub-heads) is appropriately positioned to read data from target location of a chip defined in ISO 7816.

Figure 16:
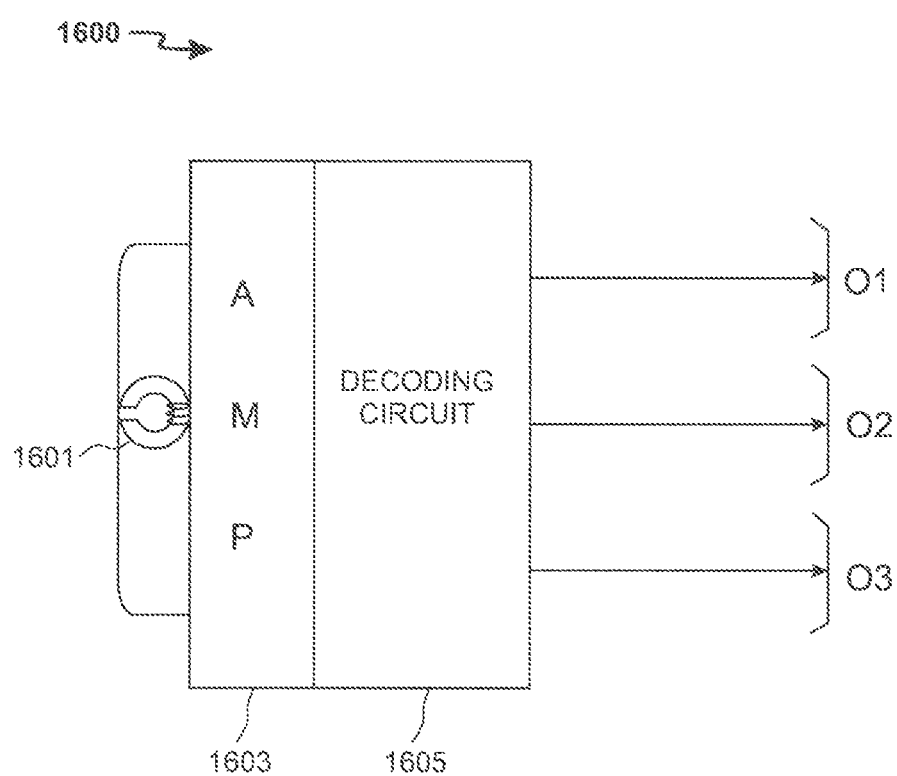
FIG. 16 shows illustrative apparatus in accordance with principles of the disclosure.

FIG. 16 shows illustrative magnetic read head 1600. Magnetic read head 1600 includes magnetic head 1601. Magnetic head 1601 may be capable of reading three tracks of data. Illustrative data tracks are shown in FIG. 13.

In some embodiments, magnetic read head 1600 may include two or more magnetic heads 1601. In such embodiments, each magnetic head may be positioned to read data from a specific data track, or specific location on a data track. Magnetic head 1601 may be capable of bi-directionally reading data encoded on a magnetic stripe. Magnetic head 1601 may be capable of reading data encoded on a magnetic stripe as the magnetic stripe moves past magnetic head 1601 at a speed of between 3-60 inches per second.

Magnetic read head 1600 includes amplifier 1603. Amplifier 1603 may amplify a signal generated by magnetic head 1603. Amplifying the signal may increase the output power of signal captured by magnetic head 1603.

Amplifying the signal captured by magnetic head 1603 may allow decoding circuit 1605 to applying digital signal processing algorithms to signals generated by magnetic head 1601 when reading data encoded on a magnetic stripe. Decoding circuit 1605 may apply encryption techniques to data captured by magnetic head 1603. Outputs O1 (e.g., from a first track, such as track 1301, shown in FIG. 13), O2 (e.g., from a second track, such as track 1303, shown in FIG. 13) and O3 (e.g., from a third track, such as track 1305, shown in FIG. 13) may be transmitted using a communication circuit, to a transaction processing network for authorization.

Thus, apparatus and methods for foldable OLED purchasing instrument reader have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. A foldable circuit board comprising:
    an array of organic light emitting diodes ("OLEDs") forming a foldable OLED display, the foldable OLED display comprising:
        a magnetic read surface area;
        a swipe surface area; and
        a fold axis;

a magnetic read head embedded within the magnetic read surface area;
a communication circuit;
a processor circuit comprising a non-transitory memory and a processor; and
a power source for powering the OLED display, the communication circuit, the magnetic read head and the processor circuit;
wherein, in operation:
the foldable OLED display is configured to bend about the fold axis and position the magnetic read surface area adjacent to the swipe surface area to form a swipe channel;
the non-transitory memory stores machine readable instructions that when executed by the processor detect formation of the swipe channel and activate the magnetic read head;
the magnetic read head is positioned to extract information from a purchasing instrument inserted into the swipe channel; and
the communication circuit is configured to transmit the information extracted from the purchasing instrument to a remote server.

2. The foldable circuit board of claim 1, wherein, the magnetic read surface area is no larger than 4 inches×1.25 inches.

3. The foldable circuit board of claim 1 further comprising:
an EMV chip reader embedded within a chip reader surface area; and
a chip dip surface area.

4. The foldable circuit board of claim 3 wherein, in operation:
when the foldable OLED display is bent in a first direction about the fold axis, the magnetic read surface area is positioned adjacent to the swipe surface area to form the swipe channel; and
when the foldable OLED display is bent in a second direction about the fold axis, the chip reader surface area is positioned adjacent to the chip dip surface area to form a chip dip channel.

5. The foldable circuit board of claim 1 wherein:
the magnetic read surface area comprises a first curved surface;
the swipe surface area comprises a second curved surface; and
when the magnetic read surface area is positioned adjacent to the swipe surface area to form the swipe channel, the first and second curved surfaces form a guide path into the swipe channel.

6. The foldable circuit board of claim 5 further comprising:
an elongated rib within the magnetic read surface area and offset from the first curved surface; and
an elongated depression within the swipe surface area and offset from the second curved surface;
wherein, in operation, the elongated rib is configured to fit within the elongated depression and provide a floor for the swipe channel.

7. The foldable circuit board of claim 1 wherein the magnetic read head is configured to read at least one track of a magnetic stripe on a credit card.

8. The foldable circuit board of claim 1 wherein the magnetic read head is configured to encrypt extracted data before transmitting the extracted data to the processor circuit.

9. A foldable circuit board comprising:
a display surface area comprising an array of organic light emitting diodes ("OLEDs") forming a OLED display bendable about a fold axis;
a magnetic read surface area comprising a magnetic read head;
a swipe surface area;
a communication circuit;
a processor circuit comprising a non-transitory memory and a processor, the non-transitory memory storing machine executable instructions, that when executed by the processor, control electronic operation of the foldable circuit board; and
a power source for powering the OLED display, the communication circuit, the magnetic read head and the processor circuit;
wherein, in operation:
the OLED display is configured to bend about the fold axis and position the magnetic read surface area adjacent to the swipe surface area to form a swipe channel; and
the magnetic read head is configured to read data encoded on a magnetic stripe as the magnetic stripe moves through the swipe channel.

10. The foldable circuit board of claim 9 defining a length and a width wherein:
the fold axis is parallel to the width; and
the magnetic read head is configured to read data encoded on the magnetic stripe as the magnetic stripe moves in a direction that is parallel to the width.

11. The foldable circuit board of claim 10 further comprising:
an elongated rib within the magnetic read surface area and parallel to the width; and
an elongated depression within the swipe surface area and parallel to the width;
wherein, in operation, the elongated rib is configured to:
fit within the elongated depression;
space the magnetic read surface area apart from the swipe surface area; and
provide a floor for the swipe channel.

12. The foldable circuit board of claim 11 wherein the floor defines a depth of the swipe channel that is at least 0.75 inches (19.05 mm) and no greater than 1.25 inches (31.75 mm).

13. The foldable circuit board of claim 9 defining a length and a width wherein:
the fold axis is parallel to the length; and
the magnetic read head is configured to read data encoded on the magnetic stripe as the magnetic stripe moves in a direction that is parallel to the length.

14. The foldable circuit board of claim 9, defining a length and a width, and wherein:
the fold axis is parallel to the width; and
the magnetic read head is configured to read data encoded on the magnetic stripe as the magnetic stripe moves in a direction that is perpendicular to the width.

15. The foldable circuit board of claim 14 further comprising:
a first pair of mating features within the magnetic read surface area;
a second pair of mating features within the swipe surface area;
wherein, in operation:
the first pair of mating features are configured to mate with the second pair of mating features when the OLED display is bent about the fold axis; and mating of the first and second pairs of mating features:
  spaces the magnetic read surface area apart from the swipe surface area; and
  forms at least two guide surfaces that direct the magnetic stripe past the magnetic read head.

16. The foldable circuit board of claim 15 wherein the at least two guide surfaces are configured to guide the magnetic stripe past the magnetic read head such that a length of the magnetic stripe moves perpendicular to fold axis.

17. A method for reading data encoded on magnetic stripe, the method comprising:
  forming a swipe channel by bending an organic light emitting diode ("OLED") display about a fold axis; and
  moving the magnetic stripe through the swipe channel and past a magnetic read head.

18. The method of claim 17 further comprising using the magnetic read head:
  extracting the data encoded on the magnetic stripe;
  encrypting the extracted data; and
  transmitting the encrypted data to a remote server.

19. The method of claim 17 wherein the swipe channel defines a central longitudinal axis, the method further comprising moving the magnetic stripe parallel to the central longitudinal axis at a speed of 3 to 60 inches per second.

20. The method of claim 17 wherein the swipe channel defines a central longitudinal axis, the method further comprising moving the magnetic stripe perpendicular to the central longitudinal axis.

\* \* \* \* \*